US012793708B2

(12) United States Patent
Shao et al.

(10) Patent No.: US 12,793,708 B2
(45) Date of Patent: Nov. 10, 2026

(54) METHOD OF RECOGNIZING SPEECH BY COMBINING ACOUSTIC PROBABILITIES WITH ADJUSTED LANGUAGE PROBABILITIES OBTAINED FROM A CONSTRAINT SUB-MODEL OF A LANGUAGE MODEL, DEVICE, AND MEDIUM

(71) Applicant: Beijing Baidu Netcom Science Technology Co., Ltd., Beijing (CN)

(72) Inventors: Junyao Shao, Beijing (CN); Zhengxiang Jiang, Beijing (CN); Sheng Qian, Beijing (CN); Xiaoyin Fu, Beijing (CN); Haifeng Wang, Beijing (CN); Lei Jia, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 242 days.

(21) Appl. No.: 18/706,341

(22) PCT Filed: Jan. 16, 2023

(86) PCT No.: PCT/CN2023/072417
§ 371 (c)(1),
(2) Date: Apr. 30, 2024

(87) PCT Pub. No.: WO2024/045475
PCT Pub. Date: Mar. 7, 2024

(65) Prior Publication Data

US 2026/0134867 A1 May 14, 2026

(30) Foreign Application Priority Data

Sep. 1, 2022 (CN) ........................ 202211064891.8

(51) Int. Cl.
*G10L 15/18* (2013.01)
*G10L 15/02* (2006.01)
(Continued)

(52) U.S. Cl.
CPC ............ *G10L 15/183* (2013.01); *G10L 15/02* (2013.01); *G10L 15/04* (2013.01); *G10L 15/063* (2013.01);
(Continued)

(58) Field of Classification Search
CPC .......... G10L 15/18; G10L 15/16; G10L 15/22
See application file for complete search history.

(56) References Cited

U.S. PATENT DOCUMENTS

2001/0016816 A1 8/2001 Lucke
2016/0104482 A1* 4/2016 Aleksic ............... G10L 15/1815 704/235

(Continued)

FOREIGN PATENT DOCUMENTS

CN 109313896 2/2019
CN 110263158 9/2019

(Continued)

OTHER PUBLICATIONS

Bruguier, Antoine, et al. "Phoebe: Pronunciation-aware contextualization for end-to-end speech recognition." ICASSP 2019-2019 IEEE International Conference on Acoustics, Speech and Signal Processing (ICASSP). IEEE, Apr. 17, 2019. (Year: 2019).*

(Continued)

*Primary Examiner* — Jialong He
(74) *Attorney, Agent, or Firm* — HSML P.C.

(57) ABSTRACT

A method of recognizing a speech, a device, and a medium. The method includes: processing, by using an acoustic model, speech data to be recognized and a first text segment obtained by recognition to obtain respective acoustic prob-
(Continued)

abilities of a plurality of candidate text segments; processing the first text segment by using a first language sub-model to obtain respective initial language probabilities of the plurality of candidate text segments; processing the first text segment by using a constraint sub-model to obtain extendibility relationships of the plurality of candidate text segments with respect to the first text segment; adjusting the initial language probabilities of the candidate text segments according to the extendibility relationships to obtain respective first language probabilities of the plurality of candidate text segments; and determining a target text segment from the plurality of candidate text segments according to the first language probabilities and the acoustic probabilities.

19 Claims, 8 Drawing Sheets

(51) Int. Cl.

| | |
|---|---|
| ***G10L 15/04*** | (2013.01) |
| ***G10L 15/06*** | (2013.01) |
| ***G10L 15/16*** | (2006.01) |
| ***G10L 15/183*** | (2013.01) |
| ***G10L 15/22*** | (2006.01) |
| ***G10L 15/26*** | (2006.01) |

(52) U.S. Cl.

CPC .............. *G10L 15/16* (2013.01); *G10L 15/26* (2013.01); *G10L 2015/0635* (2013.01)

(56) References Cited

U.S. PATENT DOCUMENTS

| | | | | |
|---|---|---|---|---|
| 2016/0293163 | A1* | 10/2016 | Moreno Mengibar | G06F 3/167 |
| 2017/0358297 | A1 | 12/2017 | Scheiner et al. | |
| 2018/0233131 | A1 | 8/2018 | Aleksic et al. | |
| 2020/0357387 | A1* | 11/2020 | Prabhavalkar | G06N 3/044 |
| 2020/0357388 | A1* | 11/2020 | Zhao | G10L 15/16 |
| 2021/0358479 | A1 | 11/2021 | Aleksic et al. | |

FOREIGN PATENT DOCUMENTS

| | | |
|---|---|---|
| CN | 110291582 | 9/2019 |
| CN | 112767921 | 5/2021 |
| CN | 114218945 | 3/2022 |
| CN | 115132209 | 9/2022 |
| JP | 2020-086437 | 6/2020 |
| WO | 2020231522 | 11/2020 |

OTHER PUBLICATIONS

International Search Report and Written Opinion, issued in the corresponding PCT application No. PCT/CN2023/072417, dated May 26, 2023, 11 pages.

* cited by examiner

METHOD OF RECOGNIZING SPEECH BY COMBINING ACOUSTIC PROBABILITIES WITH ADJUSTED LANGUAGE PROBABILITIES OBTAINED FROM A CONSTRAINT SUB-MODEL OF A LANGUAGE MODEL, DEVICE, AND MEDIUM

CROSS REFERENCE TO RELATED APPLICATION(S)

This application is a Section 371 National Stage Application of International Application No. PCT/CN2023/072417, filed on Jan. 16, 2023, entitled “METHOD AND APPARATUS OF RECOGNIZING SPEECH, DEVICE, AND MEDIUM”, which claims priority to Chinese Patent Application No. 202211064891.8, filed on Sep. 1, 2022, which is incorporated herein by reference in its entirety.

TECHNICAL FIELD

The present disclosure relates to a field of artificial intelligence, more specifically to fields of speech recognition, natural language processing, deep learning and other technologies, and in particular to a method of recognizing a speech, a device, and a medium.

BACKGROUND

With a development of a computer technology and a network technology, a deep learning technology has been widely used in many fields. For example, it is possible to recognize a speech using an acoustic model built based on the deep learning technology, so as to convert an acquired speech into a text.

SUMMARY

The present disclosure provides a method of recognizing a speech, a device, and a medium.

According to an aspect of the present disclosure, a method of recognizing a speech is provided, including: processing, by using an acoustic model, speech data to be recognized and a first text segment obtained by recognition, so as to obtain respective acoustic probabilities of a plurality of candidate text segments; processing the first text segment by using a first language sub-model in a language model, so as to obtain respective initial language probabilities of the plurality of candidate text segments; processing the first text segment by using a constraint sub-model in the language model, so as to obtain extendibility relationships of the plurality of candidate text segments with respect to the first text segment; adjusting the initial language probabilities of the candidate text segments according to the extendibility relationships, so as to obtain respective first language probabilities of the plurality of candidate text segments; and determining a target text segment from the plurality of candidate text segments according to the first language probabilities and the acoustic probabilities, so as to obtain a text sequence for the speech data to be recognized, where the constraint sub-model is trained based on a text in a predetermined text set.

According to another aspect of the present disclosure, an electronic device is provided, including: at least one processor; and a memory communicatively connected to the at least one processor, where the memory stores instructions executable by the at least one processor, and the instructions, when executed by the at least one processor, are configured to cause the at least one processor to implement the method of recognizing the speech provided in the present disclosure.

According to another aspect of the present disclosure, a non-transitory computer-readable storage medium having computer instructions therein is provided, and the computer instructions are configured to cause a computer to implement the method of recognizing the speech provided in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure. In the accompanying drawings.

DETAILED DESCRIPTION OF EMBODIMENTS

Figure 1:
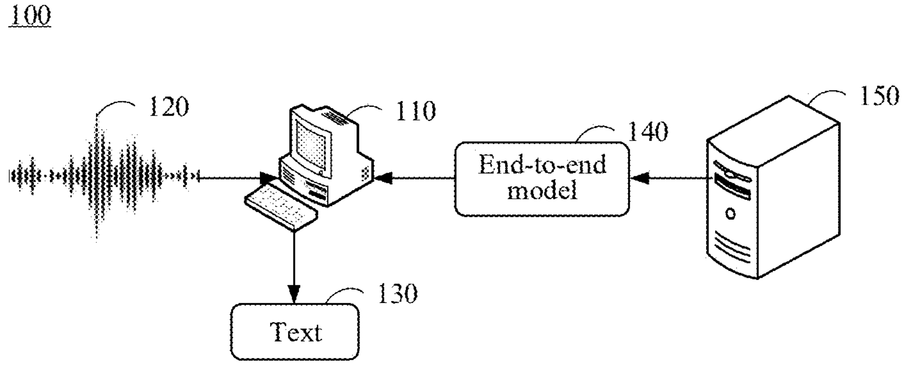
FIG. 1 shows a schematic diagram of an application scenario of a method and an apparatus of recognizing a speech according to embodiments of the present disclosure.

Exemplary embodiments of the present disclosure will be described below with reference to accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure.

Likewise, for clarity and conciseness, descriptions of well-known functions and structures are omitted in the following description.

Generally, a speech recognition task may be completed using a speech recognition acoustic modeling technology. For example, it is possible to build an end-to-end attention model to improve an accuracy of a speech recognition. However, in practical services, if a recognition task is performed relying only on an acoustic model obtained by modeling, it is difficult to meet high accuracy requirements of a specific service for the speech recognition. This is because training data of the acoustic model is generally limited and may not cover a variety of service fields. In addition, service requirements of various service fields may generally change with current events. In order to improve a recognition accuracy, it is usually needed to perform an iterative update on the acoustic model. However, due to a high iteration cost and a long iteration cycle of the acoustic model, it is difficult to keep up with a changing speed of accuracy requirements.

Based on this, a speech recognition task may be completed using a combination of a language model and an acoustic model. Advantages of massive training data and fast iterative update speed of the language model may compensate for shortcomings of the acoustic model, so as to meet the high accuracy requirements of the service for the speech recognition.

The language model may be, for example, a neural network language model (NNLM). The NNLM is substantially a sequence model, of which an input is a text sequence including a text segment predicted in a previous cycle, and an output is a probability distribution for a plurality of predetermined text segments obtained in a current cycle. In such embodiments, a predetermined text segment having a greatest probability value may be used as a text segment predicted in the current cycle according to the probability distribution. The acoustic model may be an attention-based acoustic model. Each text segment may be a text of any granularity such as a word, a character, a text of a syllable, or a phrase.

According to embodiments of the present disclosure, it is possible to fuse a probability distribution output by a single acoustic model with a probability distribution output by a single NNLM by using a decoding algorithm that relies on the language model and the attention-based acoustic model, and obtain candidate paths selected in a single decoding process according to a fusion result by means of a beam search. For example, there are N predetermined text segments and the number of beams used in the beam search is 3, a first decoding may select three segments having greatest probability values from the N predetermined text segments as candidate text segments, and each subsequent decoding may select three paths having greatest total probability values from 3*N paths as candidate paths, until all selected candidate paths include an end-of-text identifier <EOS>, or until all lengths of the text segments in the selected candidate paths reach a length threshold. The path may be represented by a segment sequence obtained from the first decoding to the current decoding, in which the segments are arranged in an order of generation. The total probability value of the path may be a product of the probability values of the segments in the segment sequence, or a sum of logarithms of the probability values of the segments in the segment sequence.

The method of combining the language model and the acoustic model may improve the recognition accuracy to a certain extent. However, in such method, an extension of the decoding path is guided according to the probability distribution output by the language model. For a recognition task of a closed set, it is difficult to ensure that a final recognized text is a text in a text set provided for the closed set recognition task, thus affecting an implementation of a downstream task (such as tasks of searching based on the recognized text, giving a speech response, etc.). That is, this method still has problems of a low recognition accuracy and a poor completion of the recognition task.

Based on this, the present disclosure provides a method and an apparatus of recognizing a speech that may improve a speech recognition accuracy so that a recognition result is consistent with a recognition task. An application scenario of the method and apparatus provided by the present disclosure will be described below with reference to FIG. 1.

FIG. 1 shows a schematic diagram of an application scenario of a method and an apparatus of recognizing a speech according to embodiments of the present disclosure.

As shown in FIG. 1, an application scenario 100 of such embodiments may include an electronic device 110. The electronic device 110 may be various electronic devices having a processing function, which may include but not be limited to a smart phone, a tablet computer, a laptop computer, a desktop computer, a smart watch, or a smart speaker, etc.

The electronic device 110 may, for example, process obtained speech data 120, such as performing a speech recognition on the speech data 120 to convert the speech data 120 into a text 130. For example, the speech data 120 may be data obtained by processing a acquired speech. The acquired speech may be a user speech acquired by an audio collector such as a microphone.

In an embodiment, the electronic device 110 may be provided with an audio collector, and the electronic device 110 may be installed with a client application having a speech recognition function, such as an input method, a browser, a smart speaker APP, or a vehicle APP (just for example). The electronic device 110 may convert the speech data into an input character through a speech recognition, so as to perform an information query, a smart speaker remote control, a vehicle remote control, etc.

In an embodiment, the electronic device 110 may complete a speech recognition task using an end-to-end model 140. The end-to-end model 140 may include, for example, the language model and the acoustic model described above, and the end-to-end model 140 may obtain the text 130 by a beam search. Alternatively, the end-to-end model 140 may be an end-to-end streaming attention model described above. Alternatively, the electronic device 110 may also complete a speech recognition task using a method of recognizing a speech to be described below, which is not limited in the present disclosure.

In an embodiment, as shown in FIG. 1, the application scenario 100 may further include a server 150. The server 150 may be, for example, a background management server that supports running of a client application in the electronic device 110. The electronic device 110 may be communicatively connected to the server 150 through a network, and the network may include a wired or wireless communication link.

For example, the server 150 may train a language model based on massive text samples and train an acoustic model based on speech-text pairs. The server 150 may combine the trained language model and the trained acoustic model into the end-to-end model 140, and fine-tune the end-to-end model 140 based on a specific scenario. The server 150 may, for example, transmit the fine-tuned end-to-end model 140 to the electronic device 110 in response to an acquisition request sent by the electronic device 110, so that the electronic device 110 may complete a speech recognition task using the end-to-end model 140.

In an embodiment, the electronic device 110 may transmit the obtained speech data 120 to the server 150, and the server 150 may perform a speech recognition on the speech data 120 according to the end-to-end model 140 to obtain the text 130.

It should be noted that the method of recognizing the speech provided by the present disclosure may be performed by the electronic device 110 or by the server 150. Accordingly, the apparatus of recognizing the speech provided by the present disclosure may be provided in the electronic device 110 or in the server 150.

It should be understood that the number and type of electronic device 110 and server 150 in FIG. 1 are just schematic. According to implementation needs, any number and type of electronic device 110 and server 150 may be provided.

The method of recognizing the speech provided by the present disclosure will be described in detail below with reference to FIG. 2 to FIG. 9.

Figure 2:
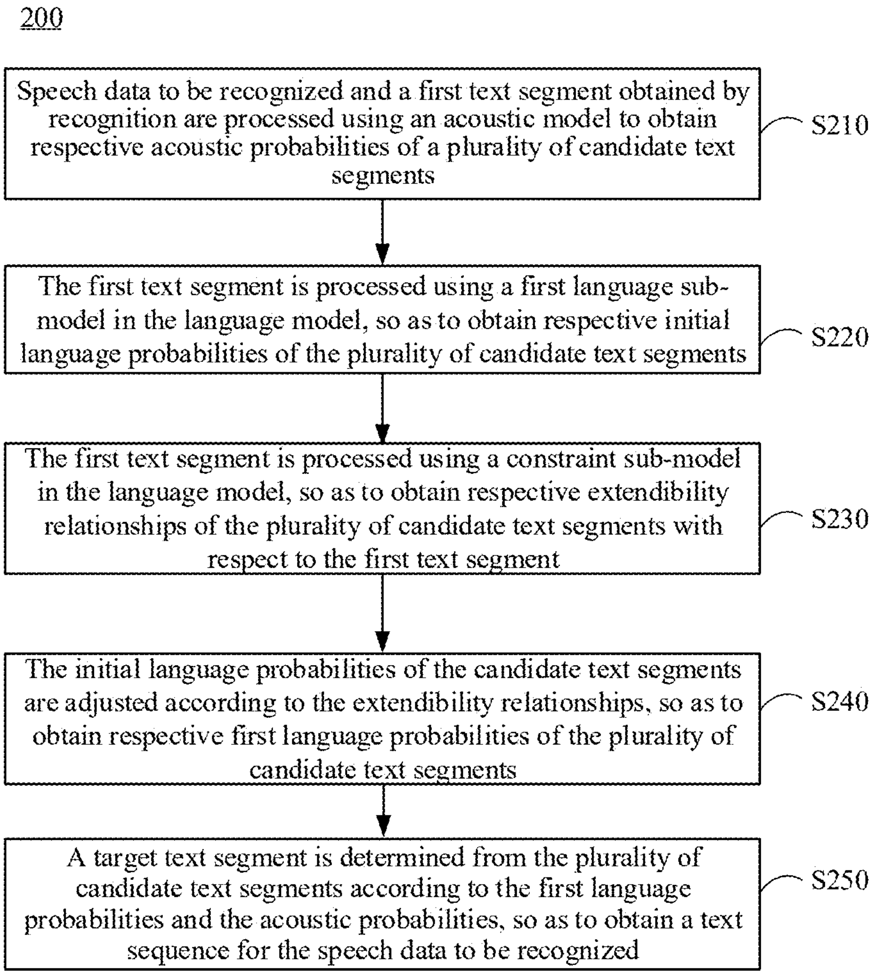
FIG. 2 shows a schematic diagram of a flowchart of a method of recognizing a speech according to embodiments of the present disclosure.

FIG. 2 shows a schematic diagram of a flowchart of a method of recognizing a speech according to embodiments of the present disclosure.

As shown in FIG. 2, a method 200 of recognizing a speech in such embodiments may include operation S210 to operation S250.

In operation S210, speech data to be recognized and a first text segment obtained by recognition are processed using an acoustic model to obtain respective acoustic probabilities of a plurality of candidate text segments.

According to embodiments of the present disclosure, the acoustic model may be a model composed of a Gaussian mixed model (GMM) and a hidden Markov model (HMM), or may be a model composed of a deep neural network (DNN) and an HMM. It may be understood that the acoustic model may include, for example, an encoder and a decoder. An input of the encoder is the speech data to be recognized, and an output is an extracted acoustic feature. An input of the decoder includes the acoustic feature and an embedding feature of the recognized first text segment. An output of the acoustic model is a probability distribution of the plurality of candidate text segments, and the probability distribution includes respective acoustic probabilities of the plurality of candidate text segments.

In an initial stage of a speech recognition, the recognized first text segment may be a start-of-text identifier <SOS>. In a subsequent stage, the recognized first text segment may be a text segment sequence composed of the start-of-text identifier <SOS> and a recognized text segment.

The plurality of candidate text segments may be, for example, a plurality of words in a word library. The words included in the word library may be set according to actual desires, which is not limited in the present disclosure.

In operation S220, the first text segment is processed using a first language sub-model in the language model, so as to obtain respective initial language probabilities of the plurality of candidate text segments.

In operation S230, the first text segment is processed using a constraint sub-model in the language model, so as to obtain respective extendibility relationships of the plurality of candidate text segments with respect to the first text segment.

In operation S240, the initial language probabilities of the candidate text segments are adjusted according to the extendibility relationships, so as to obtain respective first language probabilities of the plurality of candidate text segments.

According to embodiments of the present disclosure, the language model may be the above-mentioned NNLM, or may be an N-gram model. In such embodiments, the first text segment may be input into the language model, and the language model outputs a probability distribution of the plurality of candidate text segments. The probability distribution includes the respective first language probabilities of the plurality of candidate text segments.

According to embodiments of the present disclosure, the language model may include, for example, a first language sub-model and a constraint sub-model. The first language sub-model and the constraint sub-model may be arranged in parallel, and the first language sub-model may be the above-mentioned NNLM. A structure of the constraint sub-model is similar to that of the NNLM. An input of the first language sub-model and an input of the constraint sub-model may both be the embedding feature of the first text segment. The two sub-models may have similar network structures, with a main difference that the first language sub-model may obtain the probability distribution by processing the first text segment, while the constraint sub-model may obtain a vector representing the extendibility relationship by processing the first text segment. The probability distribution obtained by the first language sub-model includes the respective language probabilities of the plurality of candidate text segments, and the language probabilities may be used as the initial language probabilities. The vector representing the extendibility relationship includes a plurality of elements, and each element represents an extendibility relationship of a candidate text segment with respect to the first text segment. Having an extendibility relationship means that the candidate text segment may be used as a segment subsequent to the first text segment.

In an embodiment, each of the plurality of elements may have a value of 0 or 1, 0 indicates having no extendibility relationship, and 1 indicates having an extendibility relationship.

After the extendibility relationships of the plurality of candidate text segments with respect to the first text segment are obtained according to the output of the constraint sub-model, the initial probabilities of the candidate text segments may be adjusted according to the extendibility relationships. For example, it is possible to multiply the value of the element representing the extendibility relationship of each candidate text segment with respect to the first text segment by the initial language probability of that candidate text segment to obtain the first language probability of that candidate text segment. Alternatively, it is possible to take a logarithm of the value of the element representing the extendibility relationship of each candidate text segment with respect to the first text segment, then take a logarithm of the initial language probability of that candidate text segment, and add the two obtained logarithms as the first language probability of that candidate text segment.

In an embodiment, the constraint sub-model may be trained based on texts in a predetermined text set. The predetermined text set may be a text set provided for a closed set recognition task, and the closed set recognition task may be set according to actual desires.

In operation S250, a target text segment is determined from the plurality of candidate text segments according to the first language probabilities and the acoustic probabilities, so as to obtain a text sequence for the speech data to be recognized.

According to embodiments of the present disclosure, for each candidate text segment, the first language probability and the acoustic probability may be added or multiplied, and a value obtained by the addition or multiplication is used as a probability value of that candidate text segment. Then, such embodiments may be implemented to select a text segment having a greatest probability value as the target text segment.

After the target text segment is obtained, the target text segment may be added to the recognized first text segment, and operations S210 to S250 may be continued to execute until the selected text segment having the greatest probability value is an end-of-text identifier <EOS>, or a sum of the number of text segments having the greatest probability value and the number of text segments in the first text segment reaches a predetermined number.

In an embodiment, it is also possible to determine, using a beam search method, a segment at a last position in a predetermined number of (e.g., M) paths having greater total probability values as the target text segment. Then, each target text segment is added to the first text segment to obtain M adjusted text segments. After that, each adjusted text segment is used as a first text segment, and operations S210 to S240 are performed to obtain a total of M*N candidate paths. Then, M paths having greatest total probability values are selected from the M*N candidate paths, and so on, until all the selected candidate paths include the end-of-text identifier <EOS>, or until all lengths of the text segments in the selected candidate paths reach a length threshold. Then, the text segments on the candidate path having the greatest total probability value constitute the text sequence for the speech data to be recognized.

In embodiments of the present disclosure, by providing the constraint sub-model used to predict the extendibility relationship of the candidate text segment with respect to the first text segment in the language model, and adjusting the predicted initial language probability according to the extendibility relationship, it is possible to guide the extension of the decoding path by combining the extendibility relationship and the initial language probability. Accordingly, when the constraint sub-model is a neural network model and has learned the extendibility relationship between segments in the plurality of candidate text segments based on a text set provided in a closed set recognition task, under guidance of the extendibility relationship, the recognized text may be a text in the text set provided for the closed set recognition task. Therefore, a recognition accuracy may be improved, and a completion effect of the recognition task may be improved, which may help an implementation of a downstream task.

Implementations of the above-mentioned operations S220 to S240 will be further expanded and defined below with reference to FIG. 3 to FIG. 5.

Figure 3:
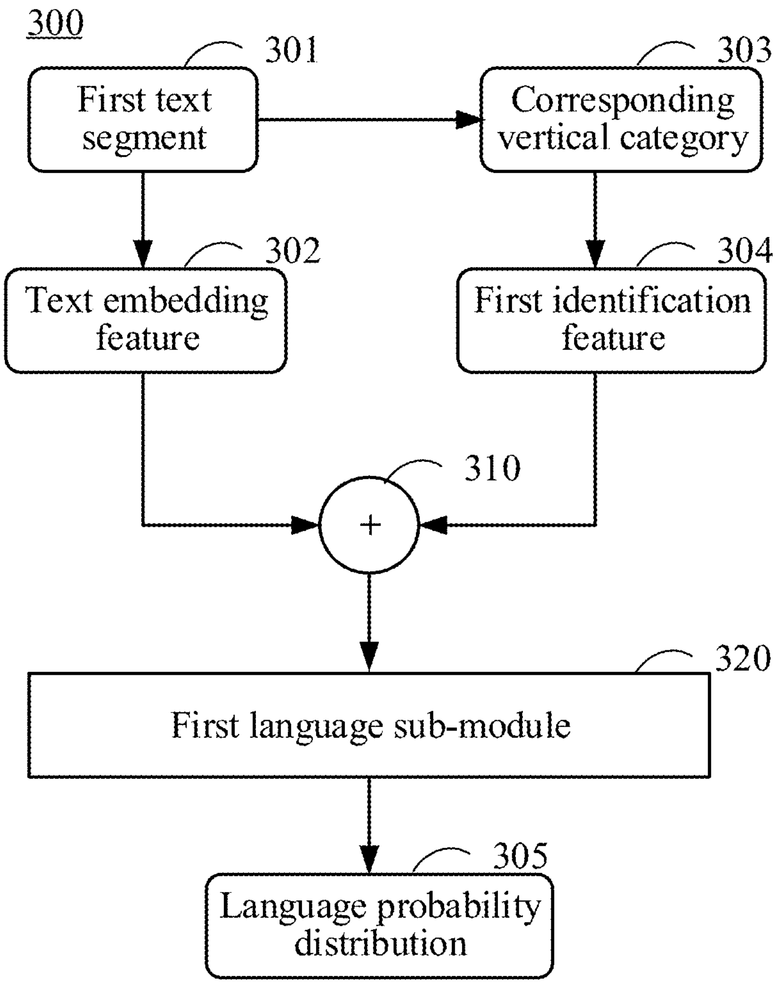
FIG. 3 shows a schematic diagram of a principle of obtaining initial language probabilities of a plurality of candidate text segments according to a first embodiment of the present disclosure.

FIG. 3 shows a schematic diagram of a principle of obtaining first language probabilities of a plurality of candidate text segments according to a first embodiment of the present disclosure.

According to embodiments of the present disclosure, when obtaining the language probability using the language model, it is also possible to, for example, add a vertical category identification to the input of the language model, so that the language model may be used to guide different paths for texts of different vertical categories. Therefore, the language model of the present disclosure may be used to predict texts of a variety of different vertical categories, which may help improve a robustness of the method of recognizing the speech in the present disclosure.

As shown in FIG. 3, in embodiment 300, when determining the respective initial language probabilities of the candidate text segments, the first text segment 301 may be processed to obtain a text embedding feature 302 of the first text segment 301. For example, the first text segment 301 may be processed using a word2vec method or a Global Vectors for Word Representation (GloVe) method.

At any time when the text embedding feature 302 is obtained, such embodiments may be implemented to determine a vertical category 303 to which the first text segment belongs and a first identification feature 304 of the vertical category 303. It may be understood that the vertical category 303 to which the first text segment belongs may be determined, for example, in response to a user operation. Alternatively, in the initial stage of the speech recognition, a plurality of predetermined vertical categories may be used as the vertical category 303 to which the first text segment belongs, and a probability distribution is obtained for each predetermined vertical category. With the extension of path, the predetermined vertical category corresponding to the selected path may be used as the vertical category to which the recognized first text segment belongs. In such embodiments, each of the plurality of predetermined vertical categories may be assigned with an identifier, and the first identification feature of the vertical category may be obtained by encoding the identifier of the vertical category.

After the text embedding feature 302 and the first identification feature 304 are obtained, such embodiments may be implemented to fuse the text embedding feature 302 and the first identification feature 304. A feature obtained by the fusion is then input into the first language sub-model 320, and processed by the first language sub-model 320 to obtain a language probability distribution 305. The language probability distribution 305 includes initial language probabilities of a plurality of predetermined text segments.

For example, the fusion of the text embedding feature 302 and the first identification feature 304 may be achieved by concatenating the two. Alternatively, the text embedding feature 302 and the first identification feature 304 may be set to have the same dimension, and in such embodiments, the text embedding feature 302 and the first identification feature 304 may be added using an adder 310 to achieve the fusion of the two. It may be understood that the above-mentioned fusion methods are just used as examples to facilitate understanding of the present disclosure, and the present disclosure is not limited to this.

For example, the first language sub-model 320 may be an NNLM model. For example, the first language sub-model 320 may include an input layer, a hidden layer and an output layer connected in sequence. The input layer may be used to convert a text into an embedding feature. It may be understood that the input layer may have a function of processing the first text segment to obtain the text embedding feature, a function of obtaining the first identification feature according to the vertical category, and a function of fusing the text embedding feature and the first identification feature as described above. The hidden layer may be a fully connected layer, or a network structure composed of a sequence network and a fully connected layer, to facilitate learning a context information between multiple data in the input sequence. The sequence network may include a network based on an attention mechanism (such as Transformer) or a long short-term memory network LSTM, etc., which is not limited in the present disclosure. The output layer may include a logistic regression network such as softmax.

Figure 4:
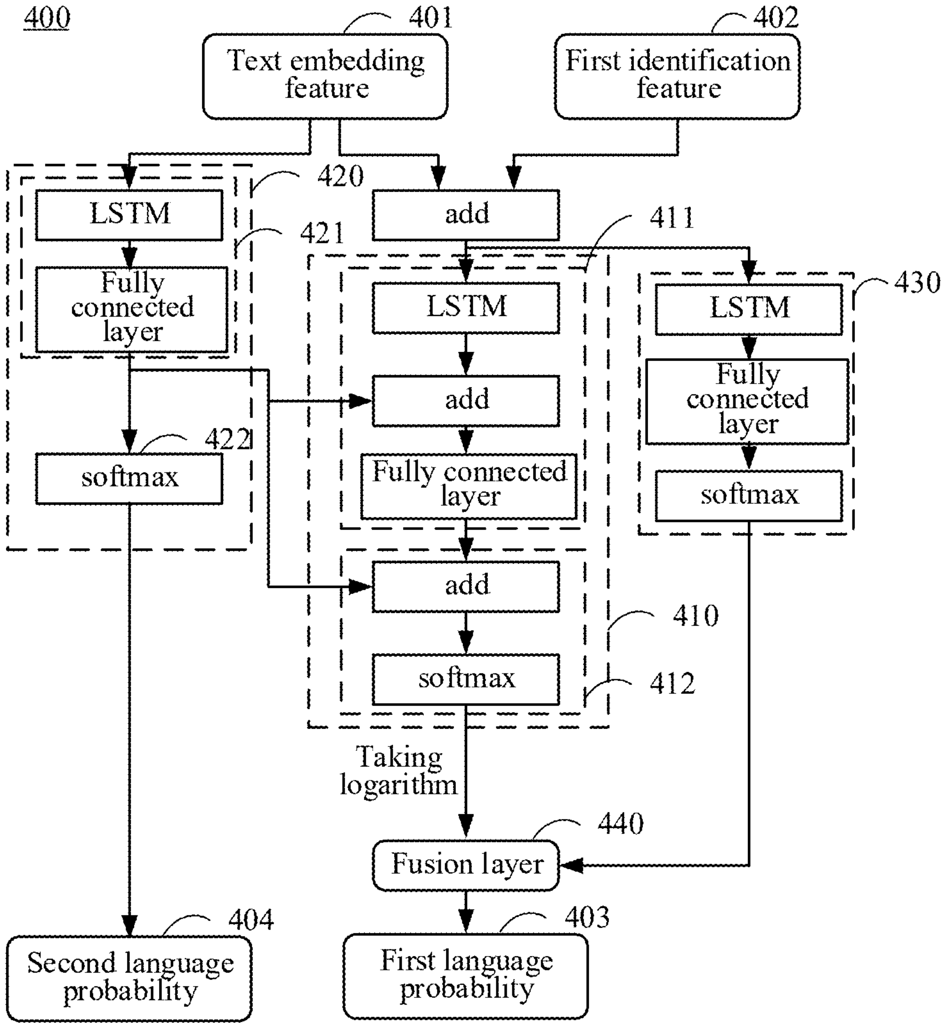
FIG. 4 shows a schematic diagram of a principle of obtaining first language probabilities of a plurality of candidate text segments according to a second embodiment of the present disclosure.

FIG. 4 shows a schematic diagram of a principle of obtaining first language probabilities of a plurality of candidate text segments according to a second embodiment of the present disclosure.

According to embodiments of the present disclosure, a general language model branch may be provided in the language model, and the language model branch may be trained using texts of a plurality of vertical categories. Considering the general language model branch has an insufficient preference in vertical categories while a language model for vertical categories usually has a too large amount of parameters, in such embodiments, the two may be combined, parameters of the general language model branch may be shared to the language model for vertical categories, and some additional parameters may be further added to the language model for vertical categories to perform a separate reinforcement learning for vertical categories. That is, two branches are provided in the language model, one is the general language model branch and the other is the language model branch for vertical categories. In this way, the model may have a small size on the basis of an optimization of a recognition rate of the language model for multiple vertical categories, so that computing power requirements during model operation may be reduced, which helps improve the robustness of the method in such embodiments.

As shown in FIG. 4, in embodiment 400, the language model may include a first language sub-model 410, a second language sub-model 420, and a constraint sub-model 430. The second language sub-model 420 and the constraint sub-model 430 are provided in parallel with the first language sub-model 410. The first language sub-model 410 and the constraint sub-model 430 constitute the language model branch for vertical categories.

When the first language probability is obtained, in such embodiments, a text embedding feature 401 may be input into the second language sub-model 420 to obtain a first implicit representation output by a hidden layer of the second language sub-model 420.

In such embodiments, the text embedding feature 401 may also be fused with the first identification feature 402 of the corresponding vertical category and then input into the first language sub-model 410, and a second implicit representation output by the hidden layer of the first language sub-model 410 may be fused with the above-mentioned first implicit representation. The fusion feature is then input into the output layer of the first language sub-model 410, and the output layer may output a language probability distribution, thereby obtaining the respective initial language probabilities of the plurality of candidate text segments.

In such embodiments, the text embedding feature 401 and the first identification feature 402 may be fused and then input into the constraint sub-model 430, and the constraint sub-model 430 may output a vector representing the extendibility relationship. The vector and the initial language probability are input into a fusion layer 440. The fusion layer 440 may adjust the initial language probability according to the vector representing the extendibility relationship, and output respective first language probabilities 403 of the plurality of candidate text segments.

The hidden layer in the first language sub-model may be used as a first feature extraction network, and the output layer may be used as a first prediction network. An input of the first prediction network includes a feature obtained by fusing the second implicit representation and the first implicit representation (for example, by using an adder), an output of the first prediction network is the probability distribution, and the vector representing the extendibility relationship may be used to adjust a logarithm value of a probability value in the probability distribution. In such embodiments, by determining the language probability according to the logarithm value of the probability value, a multiplicative relationship between values may be converted into an additive relationship between logarithms of the values, so that a calculation accuracy may be ensured. This is because an electronic device generally has a low calculation accuracy for multiplication of floating point numbers, but has a high calculation accuracy for addition.

In a specific embodiment, the first language sub-model may include an LSTM layer, an adder, a fully connected layer, and a logistic regression layer (softmax). The adder may be provided between the fully connected layer and the logistic regression layer. Accordingly, the LSTM layer and the fully connected layer constitute the first feature extraction network, and the softmax layer constitutes the first prediction network. In a specific embodiment, the adder is not only provided between the fully connected layer and the logistic regression layer, but also between the LSTM layer and the fully connected layer. Accordingly, the LSTM layer, the adder provided between the LSTM layer and the fully connected layer, and the fully connected layer may constitute a first feature extraction network 411. The adder provided between the fully connected layer and the logistic regression layer as well as the logistic regression layer may constitute a first prediction network 412. The adder between the LSTM layer and the fully connected layer is used to fuse the first implicit representation and a feature output by the LSTM layer, and the adder between the fully connected layer and the logistic regression layer is used to fuse the first implicit representation and the second implicit representation. In this way, it is possible to achieve a sufficient fusion of the first implicit representation and the features in the first language sub-model, so that the sharing of network parameters in the first language sub-model and network parameters in the second language sub-model may be enhanced, the accuracy of the obtained first language probability may be improved, and a speech recognition accuracy may be improved.

In a specific embodiment, the second language sub-model 420 may include an LSTM layer, a fully connected layer, and a softmax layer. The LSTM layer and the fully connected layer constitute a second feature extraction network 421 of the second language sub-model, and the softmax layer constitutes a second prediction network 422 of the second language sub-model. In such embodiments, after the text embedding feature 401 of the first text segment is input into the second feature extraction network 421 to obtain the second implicit representation, the second implicit representation may be input into the second prediction network 422, and the second prediction network 422 may output another probability distribution, thereby obtaining respective second language probabilities 404 of the plurality of candidate text segments. Then, such embodiments may be implemented to determine a target text segment according to the first language probability 403, the second language probability 404, and the acoustic probability. Specifically, the first language probability 403 and the second language probability 404 may be added to the acoustic probability respectively. If the number of predetermined text segments is set to N, a total of 2*N added probability values may be obtained. Then, M greater probability values are selected from the 2*N added probability values to obtain the candidate paths obtained by the current decoding. In this way, the method in embodiments of the present disclosure may be applied not only in scenarios of multiple vertical categories, but also in a general speech recognition scenario, so that the robustness of the method in such embodiments may be improved.

Figure 5:
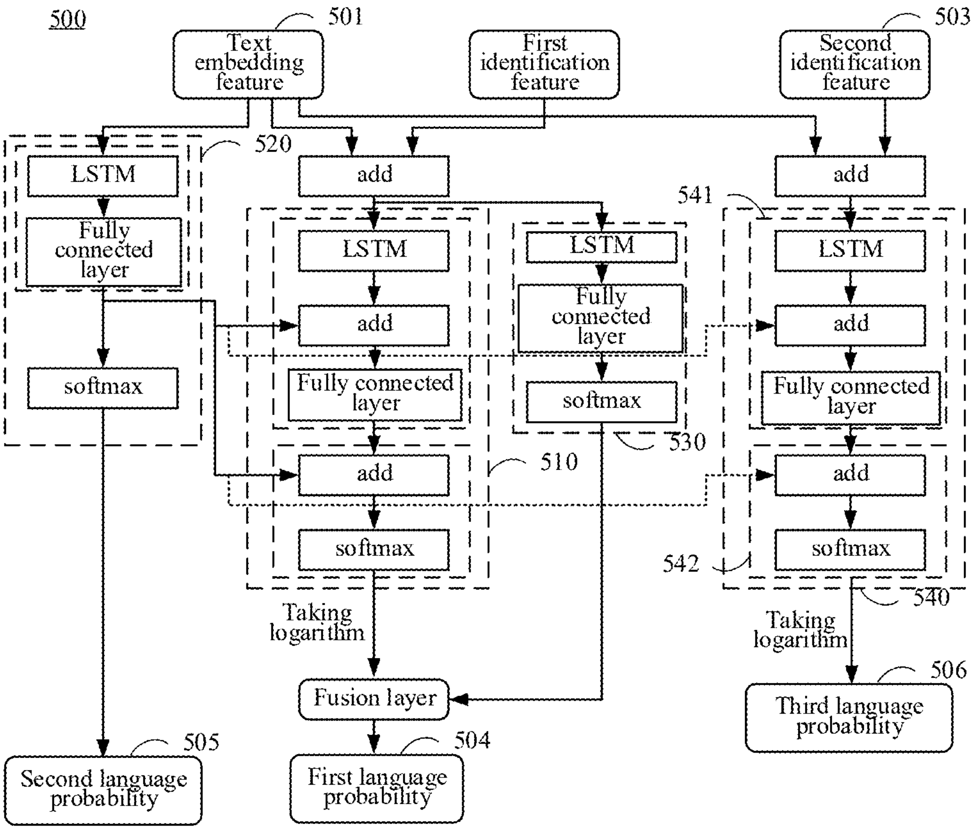
FIG. 5 shows a schematic structural diagram of a language model according to embodiments of the present disclosure.

FIG. 5 shows a schematic structural diagram of a language model according to embodiments of the present disclosure.

According to embodiments of the present disclosure, a third language sub-model parallel to the first language sub-model may be provided in the language model to learn relationships between speech data from different sources and a text. In such embodiments, the language probability obtained by the third language sub-model and the language probability obtained by the language model branch for vertical categories may be used as parallel options for selection. Therefore, the language model in such embodiments may be applied to different vertical categories in different scenarios, and does not need to be trained separately for different vertical categories and different scenarios, so that the robustness of the model may be improved, and the training cost of the model may be reduced.

As shown in FIG. 5, in embodiment 500, the language model may include a first language sub-model 510, a second language sub-model 520, a constraint sub-model 530, and a third language sub-model 540. The first language sub-model 510, the second language sub-model 520 and the constraint sub-model 530 are similar to the corresponding models in FIG. 4 described above, and will not be repeated here.

In embodiment 500, the third language sub-model 540 is similar to the first language sub-model 510, with a difference that an input of the third language sub-model is a feature obtained by fusing a second identification feature 503 representing a source of the speech data to be recognized and a text embedding feature 501.

Accordingly, when performing the speech recognition, such embodiments may be implemented to determine the second identification feature 503 representing the source of the speech data to be recognized. For example, training data may be provided when it is determined by the user that the speech recognition has a poor effect. The method in such embodiments may assign an identifier to the user and train the third language sub-model according to the training data provided by the user. In practical speech recognition, it is possible to determine the user according to the source of the speech to be recognized, and obtain the second identification feature by encoding the identifier assigned to the determined user. It may be understood that the user may be various client applications having a speech recognition function. The second identification feature may also be obtained by encoding a name of the client application, etc., which is not limited in the present disclosure.

After the second identification feature 503 is obtained, the embodiment 500 may be implemented to process, using the third language sub-model 540, a feature obtained by fusing the text embedding feature 501 and the second identification feature 503. Based on a principle similar to the principle that the first language sub-model obtains the initial language probability, the third language sub-model 540 may output a probability distribution. By taking logarithms of the probability values in the probability distribution, respective third language probabilities 506 of the plurality of candidate text segments may be obtained.

It may be understood that, as shown in FIG. 5, similar to the above-mentioned first language sub-model, in embodiment 500, the third language sub-model 540 may include a third feature extraction network and a third prediction network. In such embodiments, the feature obtained by fusing the text embedding feature 501 and the second identification feature 503 may be input into the third feature extraction network 541 to obtain a third implicit representation. Then, a feature obtained by fusing the first implicit representation and the third implicit representation is input into the third prediction network 542, and the third prediction network 542 outputs a probability distribution. By taking logarithms of the probability values in the probability distribution, respective third language probabilities 506 of the plurality of candidate text segments may be obtained.

After the third language probability 506 is obtained, such embodiments may be implemented to determine a target text segment according to the third language probability 506, the first language probability 504 and the acoustic probability. A principle is similar to the above-mentioned principle of determining the target text segment according to the first language probability, the second language probability and the acoustic probability, and will not be repeated here.

In an embodiment, on the basis that the second language probability 505 is obtained by the second language sub-model 520, the embodiment 500 may be implemented to determine the target text segment according to the first language probability 504, the second language probability 505, the third language probability 506 and the acoustic probability. A principle is similar to the above-mentioned principle of determining the target text segment according to the first language probability, the second language probability and the acoustic probability, and will not be repeated here.

It may be understood that the language model is a sequence model. When performing a recognition on the speech to be recognized, an initial input of the first language sub-model in the language model includes P features, which are obtained by adding an embedding feature of the start-of-text identifier <SOS> to the identification features of P predetermined vertical categories respectively. An initial input of the second language sub-model is the embedding feature of the start-of-text identifier <SOS>. An initial input of the third language sub-model is a feature obtained by adding the embedding feature of the start-of-text identifier <SOS> to the second identification feature representing the source of the speech to be recognized. After the processing by the language model, (P+2)*N probability values may be obtained, which correspond to (P+2)*N extension paths. In such embodiments, M paths having greater total probability values may be selected from the (P+2)*N extension paths. Accordingly, in a second decoding, the recognized first text segment includes M text segments, which are obtained by combining the start-of-text identifier <SOS> with the text segments corresponding to the M paths having greater total probability values respectively. Subsequently, the M text segments are respectively input into the second language sub-model to obtain M*N extension paths. The M text segments are respectively fused with the identification features of the vertical categories corresponding to the M paths having greater probability values and then input into the first language sub-model to obtain M*N extension paths. The M text segments are respectively fused with the second identification features and then input into the third language sub-model to obtain M*N extension paths, and a total of 3M*N extension paths are obtained. After that, M paths having greater total probability values are selected from the 3M*N extension paths, and so on. The decoding is performed multiple times until all selected M paths include the end-of-text identifier <EOS>, or until all lengths of the text segments in the selected M paths reach a length threshold. Then, a text sequence corresponding to the path having the greatest total probability value is used as a recognized text sequence for the speech data to be recognized. It may be understood that in an $i^{th}$ decoding, the number of text segments included in the selected path is (i+1), and the text segments include the start-of-text identifier <SOS>.

An implementation of the above-mentioned operation S250 will be further expanded and limited below.

According to embodiments of the present disclosure, for a closed set recognition task, for example, a predetermined text list may be provided according to a text set provided for the closed set recognition task. When determining the target text segment, the target text segment is selected from the plurality of candidate text segments according to the predetermined text list. Therefore, a text composed of the recognized text sequence belongs to the text set provided for the closed set recognition task, and the method in such embodiments has an ability to forcibly recognize a particular text in the closed set. When the closed set recognition task is a speech recognition task of a smart speaker, the method in such embodiments may ensure that a song title, a singer name, etc. contained in the recognized text sequence are existing song title and singer name, which may help to play music that meets user's actual desires according to a recognition result.

In such embodiments, the plurality of candidate text segments may include, for example, a plurality of first candidate segments indicating candidate words. The candidate words may be set according to actual desires, which are not limited in the present disclosure. When determining the target text segment, such embodiments may be implemented to query the predetermined text list according to the first text segment, and then determine a first specified segment from the plurality of first candidate segments according to a query result. For example, it is possible to query the predetermined text list and determine a text including the first text segment in the predetermined text list as a first text. For example, if the text set includes a text "Please play song a by singer A" and the first text segment is "Please play", then the text "Please play song a by singer A" may be determined as the first text. Then, the word "song" after the first text segment in the first text is used as the first specified segment. That is, a text obtained by concatenating the first specified segment and the first text segment belongs to the predetermined text list.

After the first specified segment is obtained, such embodiments may be implemented to determine the target text segment from the plurality of first candidate segments according to the first language probability and the acoustic probability of the first specified segment. For example, in such embodiments, it is possible to add a logarithm value of the first language probability and a logarithm value of the acoustic probability of the first specified segment, and an added value may be used as the probability value of the first specified segment with respect to the first text segment. In a case of only one first text segment, in such embodiments, M first specified segments having greater probability values with respect to the first text segment may be used as target text segments. In a case of a plurality of first text segments, it is possible to select, from the plurality of first text segments, a second text segment which may be concatenated with the first specified segment to obtain a text belonging to the predetermined text list, and then multiply the probability value of the first specified segment with respect to the second text segment by the probability value of the second text segment to obtain a probability value of the text obtained by concatenating the first specified segment and the second text segment. Then, in such embodiments, the first specified segment in the M texts having the greatest probability value may be used as the target text segment.

In an embodiment, for example, a recognition weight may be provided for each text in the predetermined text list, and the recognition weight may be determined according to a recognition difficulty level. For example, the recognition weight may be positively related to the recognition difficulty level. When determining the target text segment, the recognition weight may also be used to select the target text segment from the candidate text segments, which may help the method of recognizing the speech to recognize a text with a high recognition difficulty level and strengthen an ability of the method of recognizing the speech to recognize a text with a high recognition difficulty level. It may be understood that, for example, the recognition weight may be set and modified according to actual desires, which is not limited in the present disclosure.

Figure 6:
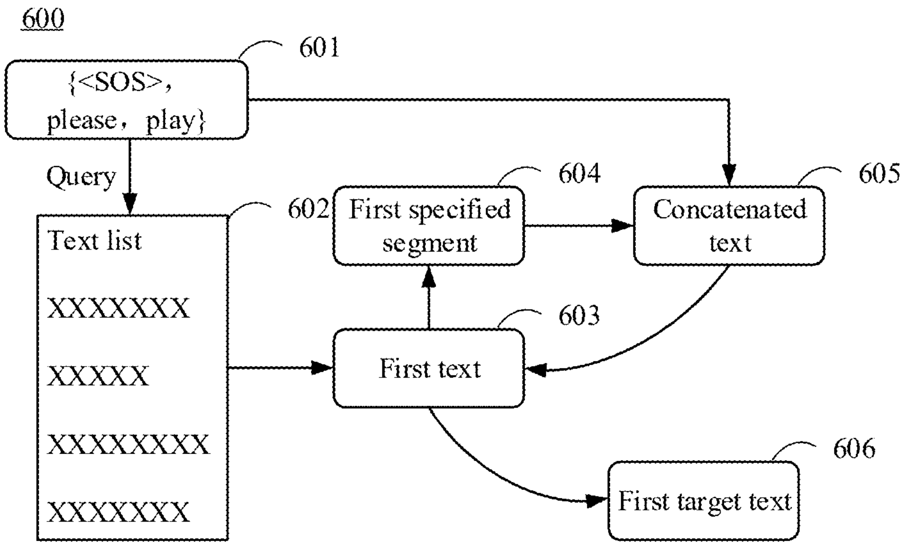
FIG. 6 shows a schematic diagram of a principle of determining a target text segment according to a first embodiment of the present disclosure.

FIG. 6 shows a schematic diagram of a principle of determining a target text segment according to a first embodiment of the present disclosure.

As shown in FIG. 6, in embodiment 600, when determining the target text segment, a predetermined text list 602 may be queried according to a first text segment 601, and a text including the first text segment 601 in the predetermined text list 602 is determined as a first text 603. In such embodiments, a text segment that belongs to the plurality of first candidate segments and is subsequent to the first text segment 601 in the first text 603 may be used as a first specified segment 604.

After that, in such embodiments, a text obtained by concatenating the first text segment 601 and the first specified segment 604 may be determined as a concatenated text 605, and a portion including the concatenated text in the first text 603 may be used as a first target text 606. Then, such embodiments may be implemented to determine a target text segment according to the recognition weight of the first target text 606, the first language probability of the first specified segment 604, and the acoustic probability of the first specified segment 604. For example, a logarithm of the recognition weight of the first target text 606, a logarithm of the first language probability of the first specified segment 604 and a logarithm of the acoustic probability of the first specified segment 604 may be added together as a probability value of the first specified segment 604 with respect to the first text segment 601, and then the target text segment may be selected from the determined first specified segments 604 according to the probability values.

According to embodiments of the present disclosure, in the predetermined text list, for example, a predetermined text may be represented in a form of a template, an entity-category text segment, etc. in the predetermined text may be represented by a slot, and entities that may be included in an entity category corresponding to the slot may be listed in the predetermined text list, which facilitates a refined path management for the speech recognition and helps to improve the speech recognition accuracy. The entity-category text segment may include, for example, text segments representing a song title, a singer name, a point of interest, etc. Different categories of entities correspond to a slot. For example, an entity of a song title category corresponds to a slot of [song], an entity of a singer name category corresponds to a slot of [singer], and an entity of a point of interest category corresponds to a slot of [POI], etc.

Accordingly, in such embodiments, the text sequence may be predicted using a decoding method of small figures nesting in large figures. A large figure corresponds to a text template, and a small figure corresponds to a slot. When a text segment subsequent to the first text segment is an entity represented by a slot, such embodiments may be implemented to predict the entity represented by the slot in combination with an identification feature of the slot. Therefore, the language model may predict according to different slots, which helps to improve an accuracy of the predicted target text segment. This is because the language model may learn mapping relationships between different slots and the predicted text segment by considering the identification features of slots.

A principle of determining the target text segment in such embodiments will be described in detail below with reference to FIG. 7.

Figure 7:
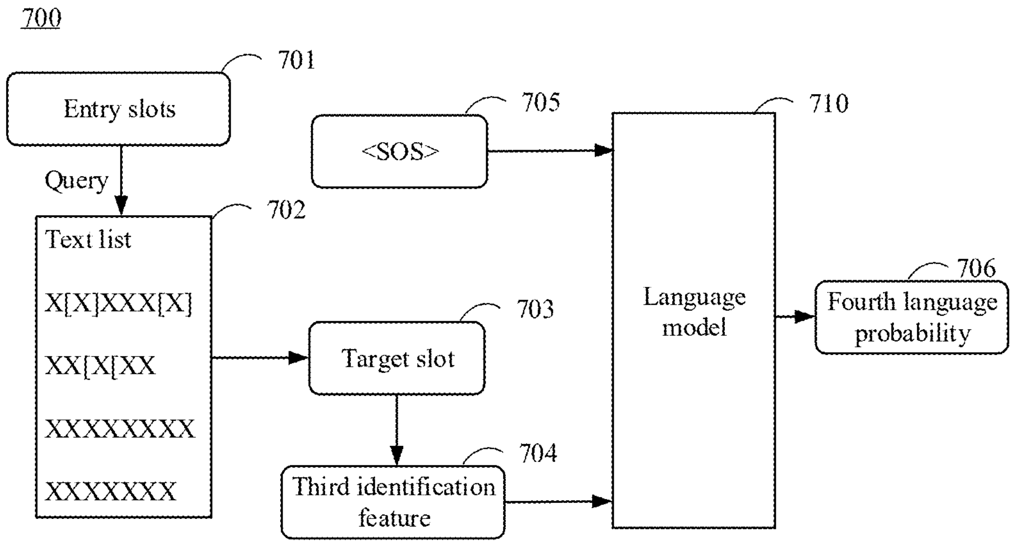
FIG. 7 shows a schematic diagram of a principle of determining a target text segment according to a second embodiment of the present disclosure.

FIG. 7 shows a schematic diagram of a principle of determining a target text segment according to a second embodiment of the present disclosure.

As shown in FIG. 7, in embodiment 700, in addition to including the plurality of first candidate segments indicating candidate words, the plurality of candidate text segments further include a plurality of second candidate segments indicating candidate slots. The candidate slots may be set according to actual desires. For example, the candidate slots may be set according to categories of entities in actual scenarios, and each category of entities corresponds to a candidate slot. A slot corresponding to each category of entities among the candidate slots may be understood as an entry slot. In a prediction process, it is also possible to provide exit slots to indicate a completion of the prediction of entities.

In embodiment 700, after the first language probability is obtained using the language model, for example, a method similar to the above-mentioned method of determining the first specified segment according to the predetermined text list may be used to determine, according to a predetermined text list 702, a target slot 703 belonging to the predetermined text list 702 from entry slots 701. In this way, it is possible to filter out entry slots that may not recognize the text in the closed set. Specifically, as described above, a text in the predetermined text list is composed of words and slots, and a corresponding position of a slot is a position of an entity in the predetermined text. Such embodiments may be implemented to compare the slot constituting the text in the predetermined text list with the entry slots 701 to obtain the target slot 703.

After that, such embodiments may be implemented to process, using a language model 710, a feature obtained according to a third identification feature 704 of the target slot 703 and a start-of-text identifier <SOS> 705, so as to obtain fourth language probabilities of the plurality of first candidate segments. The fourth language probability may represent a probability that the candidate word belongs to a segment in the target slot 703. This part is a process of jumping into the small figure for decoding. In the decoding process, the text embedding feature of the first text segment is replaced by the embedding feature of the start-of-text identifier, and the first identification feature of the vertical category to which the first text segment belongs is replaced by the third identification feature 704 of the target slot 703. Specifically, in such embodiments, the third identification feature 704 of the target slot 703 may be determined, and then the third identification feature 704 may be obtained by encoding the identifier assigned to the target slot 703, while the start-of-text identifier <SOS> 705 may be encoded to obtain a start identifier encoding feature. Then, the third identification feature 704 is added to the start identifier encoding feature to obtain a feature obtained according to the third identification feature 704 of the target slot 703 and the start-of-text identifier <SOS> 705. This feature may be input into the first language sub-model and the constraint sub-model in the language model 710. According to a principle similar to the above-mentioned principle of obtaining the first language probability, a fourth language probability 706 of the first candidate segment with respect to the target slot may be obtained.

After the fourth language probability 706 is obtained, such embodiments may be implemented to determine a target text segment from the first candidate segments according to the fourth language probability 706, the first language probability and the acoustic probability. For example, the number of target slots is set to Q. For each target slot, such embodiments may be implemented to determine probabilities of the plurality of first candidate segments being the text segment in each target slot, according to the fourth language probability obtained based on the third identification feature of that target slot and the first language probability of the second candidate segment indicating that target slot. For example, the fourth language probability of each first candidate segment may be multiplied by the first language probability of the second candidate segment indicating each target slot, as the probability of that first candidate segment being the text segment in that target slot. If the number of first candidate segments is set to N', then N' probabilities may be obtained for each target slot, and a total of Q*N' probabilities may be obtained for the Q target slots. In such embodiments, the Q*N' probabilities and the first language probabilities of the N' first candidate segments may constitute a probability set, and the probability set includes a total of (Q+1)*N' probabilities.

In such embodiment 700, for example, the logarithmic values of (Q+1)*N' probabilities may be respectively added to the logarithmic value of the acoustic probability of the corresponding first candidate segment to obtain (Q+1)*N' extension probabilities. In such embodiments, M paths may be selected from (Q+1)*N' paths corresponding to the (Q+1)*N' extension probabilities, and a text segment corresponding to a last position in the M paths may be used as the target text segment.

According to embodiments of the present disclosure, for the exit slot, the target text segment may be determined using a method similar to that for the enter slot. A difference lies in that, for the exit slot, a feature input into the language model 710 that is used to replace the text embedding feature of the first text segment is the identification feature of a slot for jumping out, which is specifically a fourth identification feature of a slot corresponding to a text segment at a last position in the first text segment. The first identification feature may be the identification feature of the vertical category to which the first text segment belongs. In such embodiments, the fourth identification feature may be fused with the first identification feature to obtain a second fusion feature. The second fusion feature may be input into the language model, and processed by the language model to obtain fifth language probabilities of the plurality of first candidate segments with respect to the exit slot. Then, such embodiments may be implemented to determine the target text segment from the plurality of first candidate segments according to the fifth language probability, the first language probability and the acoustic probability.

For example, in such embodiments, a total of Q*N' probabilities may be obtained for Q target slots by using the method described above. In such embodiments, it is also possible to multiply the first language probability of the second text segment indicating the exit slot by the fifth language probability of each first candidate segment with respect to the exit slot, as a probability that the first candidate segment is a first one of text segments after exiting from slot.

A total of N' probabilities may be obtained for the N' first candidate segments. In such embodiments, the obtained Q*N' probabilities, N' probabilities of the N' first candidate segments being the first one of text segments after exiting from slot, and N' first language probabilities of the N' first candidate segments may constitute a probability set, which includes a total of (Q+2)*N' probabilities.

Then, such embodiments may be implemented to respectively add the logarithmic values of the (Q+2)*N' probabilities to the logarithmic value of the acoustic probability of the corresponding first candidate segment, so as to obtain (Q+2)*N' extension probabilities. In such embodiments, M paths may be selected from (Q+2)*N' paths corresponding to the (Q+2)*N' extension probabilities, and a text segment corresponding to a last position in the M paths may be used as the target text segment.

According to embodiments of the present disclosure, when determining the target slot 703, for example, a slot belonging to the predetermined text list among the entry slots may be used as an initial slot. Then, the first language probability of the second candidate segment indicating the initial slot is compared with the first language probabilities of the plurality of first candidate segments, and the initial slot indicated by the second candidate segment having a relatively greater probability value is used as the target slot. For example, in such embodiment, a predetermined number of probabilities having greater values may be determined from the first language probabilities of the plurality of first candidate segments; and then the first language probability of the second candidate segment indicating the initial slot is compared with a minimum probability among the predetermined number of probabilities. If the first language probability of the second candidate segment indicating the initial slot is greater than the minimum probability, or the first language probability of the second candidate segment indicating the initial slot is less than the minimum probability and an absolute value of a difference between the two is less than or equal to a first predetermined threshold, it is determined that the initial slot is the target slot. Alternatively, in such embodiments, the first language probability of the second candidate segment indicating the initial slot may be compared with a maximum probability among the first language probabilities of the plurality of first candidate segments, and if an absolute value of a difference between the two is less than a second predetermined threshold, it is determined that the initial slot is the target slot. It may be understood that the above-mentioned method of determining the target slot according to the difference is just used as an example to facilitate understanding of the present disclosure, and the present disclosure is not limited to this.

In embodiments of the present disclosure, by determining the target slot according to the difference from the first language probabilities of the plurality of first candidate segments, a further selection may be performed on the entry slots to eliminate slots having a low extension probability, so as to reduce computation amount while ensuring the prediction accuracy, thereby improving a computational efficiency of decoding to obtain the target text segment.

Figure 8:
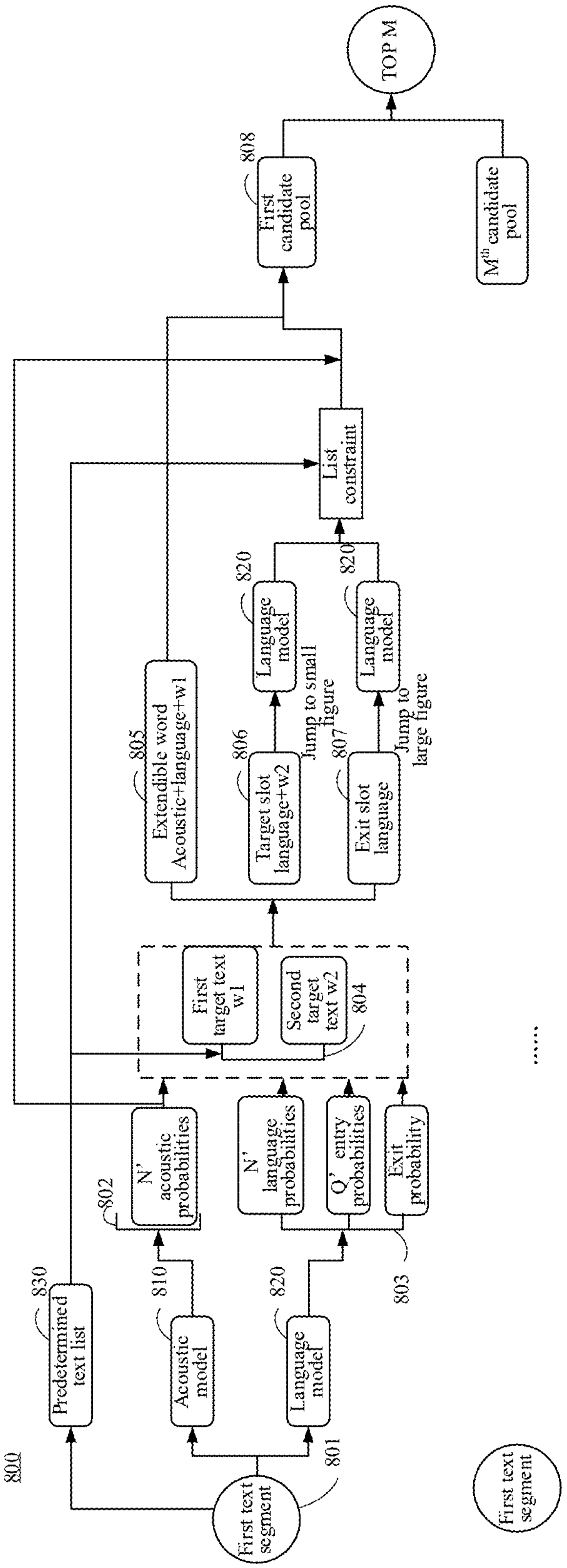
FIG. 8 shows a schematic diagram of a principle of determining a target text segment according to a third embodiment of the present disclosure.

FIG. 8 shows a schematic diagram of a principle of determining a target text segment according to a third embodiment of the present disclosure.

According to embodiments of the present disclosure, when jumping into a small figure for decoding, for example, it is also possible to select the target text segment in combination with the recognition weight assigned to the text in the predetermined text list, which may help the method of recognizing the speech to recognize a text with a high recognition difficulty level and strengthen an ability of the method of recognizing the speech to recognize a text with a high recognition difficulty level.

For example, after the above-mentioned fourth language probability is obtained, or at any time, it is possible to query the predetermined text list according to the first text segment, so as to obtain a second target text and a second specified segment among the plurality of first candidate segments. Specifically, the first text segment may be concatenated with the second candidate segments indicating the slots corresponding to the first candidate segments to obtain a plurality of concatenated texts. Then, the predetermined text list is queried according to the concatenated texts. A predetermined text including any one of the plurality of concatenated texts is determined as a second target text, and the first candidate segment corresponding to the indicated slot included in any text is used as the second specified segment. For sake of description, in such embodiments, the second candidate segment indicating the slot corresponding to the second specified segment may be used as the target candidate segment.

After that, such embodiments may be implemented to determine an initial probability of the target candidate segment according to the recognition weight of the second target text and the first language probability of the target candidate segment. For example, the recognition weight of the second target text may be multiplied by the first language probability of the target candidate segment, and a product may be used as the initial probability. Alternatively, it is possible to add the logarithmic value of the recognition weight of the second target text to the logarithmic value of the first language probability of the target candidate segment to obtain the initial probability, which is not limited in the present disclosure.

After the initial probability is obtained, such embodiments may be implemented to determine a probability of the second specified segment being a first one of text segments in the target slot according to the initial probability and the fourth language probability of the second specified segment. For example, a logarithm value of the initial probability may be added to the logarithm value of the fourth language probability of the second specified segment to obtain a probability of the second specified segment being a first one of text segments in the target slot. This probability may replace the corresponding probability among the Q*N' probabilities mentioned above.

A principle of decoding to obtain the target text segment in embodiments of the present disclosure will be described in detail below through an example with reference to FIG. 8.

As shown in FIG. 8, in embodiment 800, a beam search method is used for decoding to obtain a text sequence, if the number of beams is set to M, then in each cycle during the decoding process except for a first cycle, the number of first text segments is M. The number of candidate words is set to N', and the candidate slots include Q' entry slots and one exit slot. For a text segment 801 among the M first text segments, in such embodiments, N' acoustic probabilities 802 may be obtained using an acoustic model 810. Using the language model 820, it is possible to obtain N' language probabilities respectively corresponding to the N' candidate words, entry probabilities respectively corresponding to the Q' entry slots, and an exit probability corresponding to the exit slot, a total of (N'+Q'+1) language probabilities 803.

Moreover, such embodiments may be implemented to query a predetermined text list 830 according to the text segment 801, so as to obtain an information 804. The information 804 may include the above-mentioned first target text and its recognition weight w1, and the above-mentioned second target text and its recognition weight w2. In such embodiments, a selection may be performed on the text segments corresponding to the predicted language probabilities according to the information 804 obtained from the query, thereby obtaining an extendible word 805, the target slot 806 and the exit slot 807 mentioned above. It may be understood that the extendible word may be the above-mentioned first specified segment. When an exit probability of the exit slot 807 is much smaller than the probability of the target slot and the probability of the extendible word, the exit slot may be eliminated. The extension probability of the extendible word 805 may be represented by a sum of the logarithm value of the acoustic probability of the extendible word, the logarithm value of the language probability of the extendible word, and the recognition weight w1 of the first target text corresponding to the extendible word. An initial extension probability of the target slot 806 may be represented by a sum of the logarithmic value of the entry probability of the target slot 806 and the recognition weight w2 of the second target text corresponding to the target slot. An initial extension probability of the exit slot is represented by the logarithm value of the exit probability.

In such embodiments, the extendible word 805 may be used as a candidate text segment. The candidate text segment may be concatenated with the text segment 801, and the concatenated text may be added to a first candidate pool 808 for the text segment 801.

For the target slot, in such embodiments, a method similar to the above-mentioned method may be used to input the embedding feature of the start-of-text identifier and the identification feature of the target slot into a language model 820, and jump into the small figure to perform a decoding operation, thereby obtaining the above-mentioned fourth language probability. For the exit slot, in such embodiments, a method similar to the above-mentioned method may be used to input the identification feature of the vertical category to which the first text segment belongs and the identification feature of the slot corresponding to the text segment at the last position in the first text segment into a language model 820, and jump into the large figure to perform a decoding operation, thereby obtaining the above-mentioned fifth language probability. Then, such embodiments may be implemented to query the predetermined text list, perform a constraint on the fourth language probability and the fifth language probability according to the text in the list, and select a text segment belonging to the text in the predetermined text list. The text segment is concatenated with the text segment 801 and then added to the first candidate pool 808.

Based on a similar principle, for each of the M first text segments, M candidate pools may be obtained. In such embodiments, M candidate text segments having the greatest total probability value may be selected from the M candidate pools as M first text segments in a next cycle, until all the selected M candidate text segments include the end-of-text identifier <EOS>, or the number of text segments in the M candidate text segments reaches a predetermined value.

In summary, in embodiments of the present disclosure, it is generally needed to perform two calculations using the language model in a single cycle. In order to improve the calculation efficiency, in such embodiments, when the number of times of processing the first target feature using the language model reaches a predetermined value, the language probability obtained by processing the first target feature using the language model is stored in a cache for a subsequent call. Accordingly, when it is determined that it is required to process a particular target feature (for example, a second target feature) using the language model, it is possible to query the cache to determine whether the language probability for the second target feature is stored in the cache. If so, the language probability may be directly read from the cache, and the processing of the second target feature by the language model is completed without a complex calculation using the language model.

It may be understood that the first target feature and the second target feature may include any feature selected from: the text embedding feature of the first text segment; the feature obtained by fusing the text embedding feature and the identification feature of the vertical category; the feature obtained by fusing the text embedding feature and the identification feature indicating the data source; or the feature obtained by fusing the text embedding feature and the identification feature of the slot. That is, the first target feature and the second target feature may be any feature input into the hidden layer in the language model described above, which is not limited in the present disclosure.

In an embodiment, the operation of determining the target text segment may also be performed using a high-performance processor such as a graphic processing unit (GPU), so that the calculation for the M first text segments or any calculation involved in the process of determining the target text segment that may be performed in parallel may be executed in parallel by the GPU, etc., thereby further improving the decoding efficiency and improving the speech recognition efficiency.

According to embodiments of the present disclosure, a text segment table may be maintained for a candidate slot, and text segments belonging to the candidate slot may be added to the text segment table. In such embodiments, after the text sequence is recognized, for example, a slot text segment belonging to the candidate slot in the text sequence may be compared with a text segment in the text segment table for the candidate slot. Specifically, in response to the text sequence including a slot text segment belonging to the candidate slot, it is possible to query the text segment table for the candidate slot according to the slot text segment. If the slot text segment does not belong to the text segment table for the candidate slot, the slot text segment may be compared with each text segment in the text segment table for the slot, and a text segment having a greatest similarity to the slot text segment in the text segment table is used as a candidate segment. Then, the slot text segment in the text sequence is replaced by the candidate segment, and the replaced text segment is used as a recognition result for the speech data to be recognized.

In this way, it may be ensured that the text segment at the candidate slot in the text sequence is a text segment in the text segment table, and it may be ensured that the text segment in the generated recognition result is a rational segment. For example, if the slot text segment is "upple", then through query, the "upple" may be replaced by "apple", so that a rational recognition result is generated, and the accuracy of the recognition result is improved.

Figure 9:
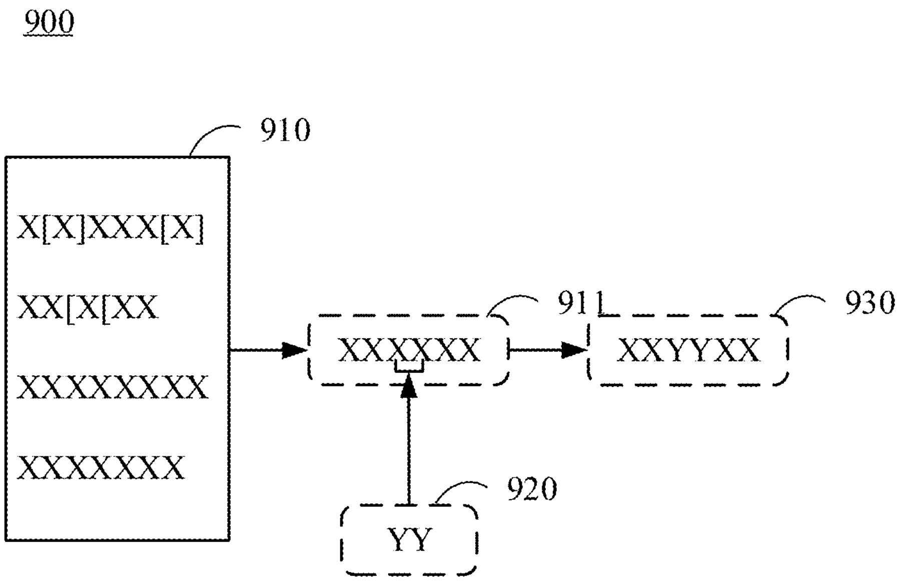
FIG. 9 shows a schematic diagram of a generation principle of a negative sample used to train a constrain sub-model according to embodiments of the present disclosure.

The generation of samples used for training the constraint sub-model in the language model will be expanded and defined with reference to FIG. 9, so that the constraint sub-model may learn an extendibility relationship between a plurality of candidate text segments in the closed set recognition task, which may help improve a completion effect of tasks and facilitate an implementation of a downstream task.

FIG. 9 shows a schematic diagram of a generation principle of a negative sample used to train a constrain sub-model according to embodiments of the present disclosure.

According to embodiments of the present disclosure, samples for training the constraint sub-model may include, for example, positive samples and negative samples. The positive sample may include a text in the predetermined text set, and the negative sample may be any text other than the text in the predetermined text set. In this way, it is possible to clip a text generation path that does not belong to a text in the predetermined text set during the decoding process, on the basis of the vector representing the extendibility relationship generated by the constraint sub-model.

In an embodiment, the predetermined text segment may be adjusted according to a second text segment among the plurality of candidate text segments that is inconsistent with a text segment at a target position in the predetermined text, and the adjusted text may be used as a negative sample. The target position may be any position in the predetermined text. By generating the negative sample in this way, a learning ability of the constraint sub-model may be improved because the negative sample differs from the positive sample only in the text segment at the target position.

For example, as shown in FIG. 9, in embodiment 900, a predetermined text may be randomly extracted from a predetermined text set 910 as a positive sample 911. In such embodiments, it is also possible to remove a predetermined number of text segments at a last position in the extracted predetermined text, and the obtained text is also used as a positive sample.

After the predetermined text is extracted, the text segment at the target position in the predetermined text may be replaced by the above-mentioned second text segment 920, thereby obtaining a negative sample 930.

In an embodiment, the target position may be, for example, the last position in the predetermined text. Accordingly, the negative sample and the positive sample may have the same prefix tree. In the decoding process, it is possible to effectively clip the text generation path of the text in the last cycle that does not belong to a text in the predetermined text set.

In an embodiment, the target position may be any position. In such embodiments, after the text segment at the target position in the extracted predetermined text is replaced by the second text segment 920, the text segment located after the target position in the predetermined text may be removed, thereby obtaining a negative sample.

In such embodiments, the negative sample is obtained by removing the text segment after the target position, so that all negative samples have the same prefix as the positive samples. By selecting the target position as any position, the constraint sub-model may learn the extendibility relationship between any two text segments in the predetermined text, which may help improve a clipping accuracy and effectiveness of the decoding path.

In an embodiment, when adjusting the predetermined text using the second text segment, for example, a segment for replacement in the second text segment may be determined according to a confusion relationship between the second text segment and the text segment at the target position in the predetermined text. Then, the text segment at the target position in the predetermined text may be replaced by the segment for replacement, and the text obtained after replacement may be used as a negative sample. In this way, the generated negative sample may be a text that is easily confused with the predetermined text (that is, the positive sample), which may help improve a discrimination ability of the constraint sub-model. Furthermore, through the selection of the segment for replacement in such embodiments, it is possible to effectively reduce the number of negative samples and a pertinence of the negative samples, which may help improve a training efficiency of the constraint sub-model.

The confusion relationship may be represented by, for example, a text similarity, a syllable similarity, etc. between text segments. The higher the similarity, the easier it is to confuse.

In an embodiment, when generating the negative sample, for example, the text segment at the target position in the predetermined text may be replaced by the second text segment, and the obtained text segment may be used as a candidate sample. Then, each candidate sample may be processed using the above-mentioned pre-trained first language sub-model, so as to obtain the language probability of each candidate sample generated by the first language sub-model. The language probability may be a product of a plurality of language probabilities of a plurality of text segments in each candidate sample that are generated in sequence. Then, such embodiments may be implemented to perform a selection on the candidate samples according to the sixth language probabilities, and the candidate sample having the sixth language probability greater than a probability threshold is used as a negative sample. Alternatively, several candidate samples having greater sixth language probabilities may be used as negative samples. Through this method, a size of the negative samples may be controlled, and it may be ensured that the generation path of the negative sample is an optional path for the first language sub-model to obtain the text sequence by decoding, so that the constraint sub-model may be trained in a targeted manner, and a training efficiency of the constraint sub-model and the accuracy of the trained constraint sub-model may be improved.

In an embodiment, the size of the negative samples may be controlled by combining the sixth language probability and the confusion relationship, thereby improving the training efficiency and training effect of the constraint sub-model.

Based on the method of recognizing the speech provided by the present disclosure, the present disclosure further provides an apparatus of recognizing a speech. The apparatus will be described in detail below with reference to FIG. 10.

Figure 10:
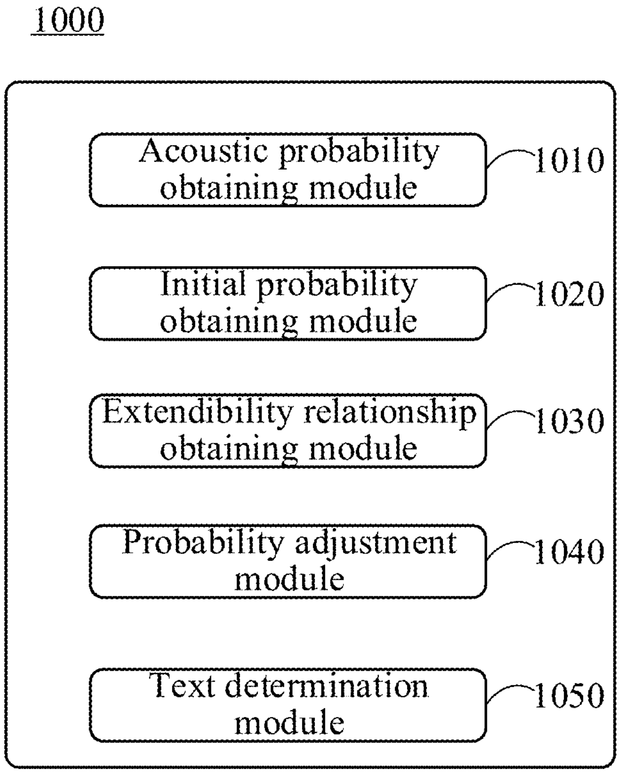
FIG. 10 shows a structural block diagram of an apparatus of recognizing a speech according to embodiments of the present disclosure.

FIG. 10 shows a structural block diagram of an apparatus of recognizing a speech according to embodiments of the present disclosure.

As shown in FIG. 10, an apparatus 100 of recognizing a speech in such embodiments may include an acoustic probability obtaining module 1010, an initial probability obtaining module 1020, an extendibility relationship obtaining module 1030, a probability adjustment module 1040, and a text determination module 1050.

The acoustic probability obtaining module 1010 is used to process, by using an acoustic model, speech data to be recognized and a first text segment obtained by recognition, so as to obtain respective acoustic probabilities of a plurality of candidate text segments. In an embodiment, the acoustic probability obtaining module 1010 may be used to execute operation S210 described above, which will not be repeated here.

The initial probability obtaining module 1020 is used to process the first text segment by using a first language sub-model in a language model, so as to obtain respective initial language probabilities of the plurality of candidate text segments. The extendibility relationship obtaining module 1030 is used to process the first text segment by using a constraint sub-model in the language model, so as to obtain extendibility relationships of the plurality of candidate text segments with respect to the first text segment. The probability adjustment module 1040 is used to adjust the initial language probabilities of the candidate text segments according to the extendibility relationships, so as to obtain respective first language probabilities of the plurality of candidate text segments. The constraint sub-model is trained based on a text in a predetermined text set. In an embodiment, the initial probability obtaining module 1020, the extendibility relationship obtaining module 1030 and the probability adjustment module 1040 may be used to respectively execute operations S220 to S240 described above, which will not be repeated here.

The text determination module 1050 is used to determine a target text segment from the plurality of candidate text segments according to the first language probabilities and the acoustic probabilities, so as to obtain a text sequence for the speech data to be recognized. In an embodiment, the text determination module 1050 may be used to execute operation S250 described above, which will not be repeated here.

According to embodiments of the present disclosure, the initial probability obtaining module 1020 may include: an embedding sub-module used to perform an embedding on the first text segment to obtain a text embedding feature; a feature determination sub-module used to determine a first identification feature of a vertical category to which the first text segment belongs; and a first probability determination sub-module used to process, by using the first language sub-model, a feature obtained by fusing the text embedding feature and the first identification feature, so as to obtain the respective initial language probabilities of the plurality of candidate text segments.

According to embodiments of the present disclosure, the language model further includes a second language sub-model provided in parallel with the first language sub-model. The apparatus further includes: an implicit representation obtaining module used to input the text embedding feature into the second language sub-model to obtain a first implicit representation of the first text segment. The first language sub-model includes a first feature extraction network and a first prediction network. The first probability determination sub-module may include: an implicit representation obtaining unit used to input the feature obtained by fusing the text embedding feature and the first identification feature into the first feature extraction network to obtain a second implicit representation; and a first probability obtaining unit used to input a features obtained by fusing the first implicit representation and the second implicit representation into the first prediction network to obtain the respective initial language probabilities of the plurality of candidate text segments. The second language sub-model is trained using sample texts of a plurality of predetermined vertical categories.

According to embodiments of the present disclosure, the second language sub-model includes a second feature extraction network and a second prediction network. The implicit representation obtaining module is used to input the text embedding feature into the second feature extraction network to obtain the second implicit representation. The apparatus 1000 may further include: a first probability obtaining module used to input the second implicit representation into the second prediction network to obtain respective second language probabilities of the plurality of candidate text segments. The text determination module 1050 is further used to determine the target text segment according to the second language probabilities, the first language probabilities and the acoustic probabilities.

According to embodiments of the present disclosure, the language model further includes a third language sub-model provided in parallel with the first language sub-model. The apparatus 1000 may further include: an identification feature determination module used to determine a second identification feature representing a source of the speech data to be recognized; a second probability obtaining module used to process, by using the third language sub-model, a feature obtained by fusing the text embedding feature and the second identification feature, so as to obtain respective third language probabilities of the plurality of candidate text segments. The text determination module 1050 is further used to determine the target text segment according to the third language probabilities, the first language probabilities and the acoustic probabilities.

According to embodiments of the present disclosure, the third language sub-model includes a third feature extraction network and a third prediction network. The second probability obtaining module may include: an implicit representation obtaining sub-module used to input the feature obtained by fusing the text embedding feature and the second identification feature into the third feature extraction network to obtain a third implicit representation; and a first probability obtaining sub-module used to input a feature obtained by fusing the first implicit representation and the third implicit representation into the third prediction network to obtain the respective third language probabilities of the plurality of candidate text segments.

According to embodiments of the present disclosure, the first text segment is a start-of-text identifier, and the vertical category to which the first text segment belongs includes a plurality of predetermined vertical categories. The first probability determination sub-module may include: a feature fusion unit used to fuse, for each of the plurality of predetermined vertical categories, the text embedding feature and an identification feature of each predetermined vertical category to obtain a first fusion feature; and a second probability obtaining unit used to process the first fusion feature using the first language sub-model to obtain the respective initial language probabilities of the plurality of candidate text segments.

According to embodiments of the present disclosure, the plurality of candidate text segments include a plurality of first candidate segments indicating candidate words. The text determination module 1050 may include: a specified segment determination sub-module used to query a predetermined text list according to the first text segment to determine a first specified segment from the plurality of first candidate segments, where a text obtained by concatenating the first text segment and the first specified segment belongs to the predetermined text list; and a first segment determination sub-module used to determine the target text segment from the plurality of first candidate segments according to the first language probability of the first specified segment and the acoustic probability of the first specified segment.

According to embodiments of the present disclosure, the predetermined text list includes a plurality of texts and a recognition weight of each of the plurality of texts, the recognition weight indicates a difficulty of recognition of the text. The first segment determination sub-module includes: a first determination unit used to determine a first target text to which the text obtained by concatenating the first text segment and the first specified segment belongs in the predetermined text list; and a second determination unit used to determine the target text segment from the plurality of candidate text segments according to the recognition weight of the first target text, the first language probability of the first specified segment and the acoustic probability of the first specified segment.

According to embodiments of the present disclosure, the plurality of candidate text segments further include a plurality of second candidate segments indicating candidate slots; the candidate slots include entry slots. The text determination module 1050 may include: a slot determination sub-module used to determine, from the entry slots, a target slot belonging to the predetermined text list; a second probability determination sub-module used to process, by using the language model, a feature obtained according to a third identification feature of the target slot and the start-of-text identifier, so as to obtain fourth language probabilities of the plurality of first candidate segments with respect to the target slot; and a second segment determination sub-module used to determine the target text segment from the plurality of first candidate segments according to the fourth language probabilities, the first language probabilities and the acoustic probabilities.

According to embodiments of the present disclosure, the candidate slots further include exit slots. The text determination module 1050 may further include: a fusion sub-module used to fuse the first identification feature of the vertical category to which the first text segment belongs and a fourth identification feature of a slot corresponding to a text segment at a last position in the first text segment, so as to obtain a second fusion feature; a second probability determination sub-module used to process the second fusion feature using the language model to obtain respective fifth language probabilities of the plurality of first candidate segments with respect to the exit slots; and a third segment determination sub-module used to determine the target text segment from the plurality of first candidate segments according to the fifth language probabilities, the fourth language probabilities, the first language probabilities and the acoustic probabilities.

According to embodiments of the present disclosure, the slot determination sub-module may include: an initial slot determination unit used to determine, from the entry slots, slots belonging to the predetermined text list, so as to obtain initial slots; and a target slot determination unit used to determine the target slot from the initial slots according to a difference between the first language probability of a second candidate segment indicating the initial slot and the first language probabilities of the plurality of the first candidate segments. The first language probability of the second candidate segment indicating the target slot is greater than the first language probability of the second candidate segment indicating another slot other than the target slot among the initial slots.

According to embodiments of the present disclosure, the second segment determination sub-module may include: a third determination unit used to query the predetermined text list according to the first text segment to obtain a second target text and a second specified segment among the plurality of first candidate segments; a text obtained by concatenating the first text segment and a target candidate segment indicating the target slot corresponding to the second specified segment belongs to the second target text; a probability determination unit used to obtain an initial probability of the target candidate segment according to the recognition weight of the second target text and the first language probability of the target candidate segment; and a segment determination unit used to determine the target text segment from the second specified segments according to the initial probability and the fourth language probability of the second specified segment.

According to embodiments of the present disclosure, the apparatus 1000 may further include: a table query module used to query, in response to the text sequence including a slot text segment belonging to the candidate slot, a text segment table for the candidate slot according to the slot text segment; a candidate segment determination module used to determine, in response to the slot text segment not belonging to the text segment table, a text segment having a greatest similarity to the slot text segment in the text segment table as a candidate segment; and a recognition result obtaining module used to replace the slot text segment in the text sequence with the candidate segment, so as to obtain a recognition result for the speech data to be recognized.

According to embodiments of the present disclosure, the apparatus 1000 may further include: a probability storing module used to store a language probability obtained by processing a first target feature using the language model in a cache, in response to the number of times of processing the first target feature using the language model reaching a predetermined value; a cache query module used to query the cache according to a second target feature, in response to the second target feature being to be processed using the language model; and a probability reading module used to read a language probability of the second target feature from the cache to complete processing of the second target feature using the language model, in response to the language probability of the second target feature being stored in the cache. The first target feature and the second target feature include any feature selected from: the text embedding feature of the first text segment, a feature obtained by fusing the text embedding feature and the identification feature of the vertical category, a feature obtained by fusing the text embedding feature and the identification feature indicating a data source; or a feature obtained by fusing the text embedding feature and the identification feature of a slot.

According to embodiments of the present disclosure, the determining a target text segment from the plurality of candidate text segments according to the first language probabilities and the acoustic probabilities is performed by a graphics processing unit provided on an electronic device.

According to embodiments of the present disclosure, samples for training the constraint sub-model include a positive sample and a negative sample, the positive sample includes a text in the predetermined text set. The apparatus further includes: a positive sample obtaining module used to adjust the predetermined text according to a second text segment inconsistent with a text segment at a target position in the predetermined text among the plurality of candidate text segments, so as to obtain the negative sample.

According to embodiments of the present disclosure, the negative sample obtaining module includes: a fourth segment determination sub-module used to determine a segment for replacement in the second text segment according to a confusion relationship between the second text segment and the text segment at the target position in the predetermined text; and a first replacement sub-module used to replace the text segment at the target position in the predetermined text by the segment for replacement, so as to obtain the negative sample.

According to embodiments of the present disclosure, the negative sample obtaining module includes: a second replacement sub-module used to replace the text segment at the target position in the predetermined text by the second text segment, so as to obtain candidate samples; a second probability obtaining sub-module used to process each of the candidate samples using the first language sub-model, so as to obtain a sixth language probability of each sample; and a sample selection sub-module used to perform a selection on the candidate samples according to the sixth language probability, so as to obtain the negative sample.

According to embodiments of the present disclosure, the negative sample obtaining module includes: a second replacement sub-module used to replace the text segment at the target position in the predetermined text by the second text segment, so as to obtain an initial text; and a segment removal sub-module used to remove a text segment after the target position in the initial text, so as to obtain the negative sample.

It should be noted that in technical solutions of the present disclosure, a collection, a storage, a use, a processing, a transmission, a provision, a disclosure, an application and other processing of user personal information involved comply with provisions of relevant laws and regulations, take necessary security measures, and do not violate public order and good custom. In the technical solutions of the present disclosure, the acquisition or collection of user personal information has been authorized or allowed by users.

According to embodiments of the present disclosure, the present disclosure further provides an electronic device, a readable storage medium, and a computer program product.

Figure 11:
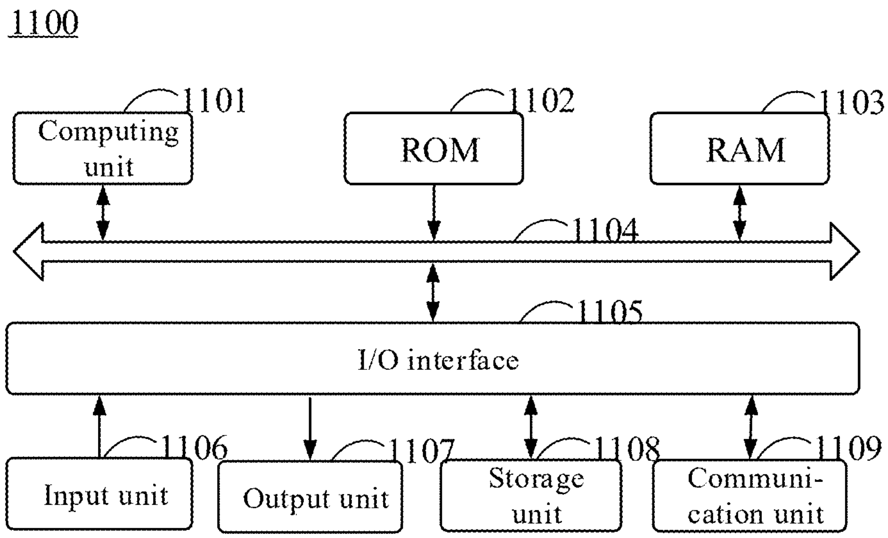
FIG. 11 shows a block diagram of an electronic device for implementing a method of recognizing a speech according to embodiments of the present disclosure.

FIG. 11 shows a schematic block diagram of an example electronic device 1100 for implementing a method of recognizing a speech according to embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 11, the electronic device 1100 includes a computing unit 1101 which may perform various appropriate actions and processes according to a computer program stored in a read only memory (ROM) 1102 or a computer program loaded from a storage unit 1108 into a random access memory (RAM) 1103. In the RAM 1103, various programs and data necessary for an operation of the electronic device 1100 may also be stored. The computing unit 1101, the ROM 1102 and the RAM 1103 are connected to each other through a bus 1104. An input/output (I/O) interface 1105 is also connected to the bus 1104.

A plurality of components in the electronic device 1100 are connected to the I/O interface 1105, including: an input unit 1106, such as a keyboard, or a mouse; an output unit 1107, such as displays or speakers of various types; a storage unit 1108, such as a disk, or an optical disc; and a communication unit 1109, such as a network card, a modem, or a wireless communication transceiver. The communication unit 1109 allows the electronic device 1100 to exchange information/data with other devices through a computer network such as Internet and/or various telecommunication networks.

The computing unit 1101 may be various general-purpose and/or dedicated processing assemblies having processing and computing capabilities. Some examples of the computing units 1101 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1101 executes various methods and processes described above, such as the method of recognizing the speech. For example, in some embodiments, the method of recognizing the speech may be implemented as a computer software program which is tangibly embodied in a machine-readable medium, such as the storage unit 1108. In some embodiments, the computer program may be partially or entirely loaded and/or installed in the electronic device 1100 via the ROM 1102 and/or the communication unit 1109. The computer program, when loaded in the RAM 1103 and executed by the computing unit 1101, may execute one or more steps in the method of recognizing the speech described above. Alternatively, in other embodiments, the computing unit 1101 may be used to perform the method of recognizing the speech by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, speech input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. A relationship between the client and the server is generated through computer programs running on the corresponding computers and having a client-server relationship with each other. The server may be a cloud server, also known as a cloud computing server or a cloud host, which is a host product in a cloud computing service system to solve shortcomings of difficult management and weak service scalability existing in a conventional physical host and VPS (Virtual Private Server) service. The server may also be a server of a distributed system or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of recognizing a speech, comprising:

processing, by using an acoustic model, speech data to be recognized and a first text segment obtained by recognition, so as to obtain respective acoustic probabilities of a plurality of candidate text segments;

processing the first text segment by using a first language sub-model in a language model, so as to obtain respective initial language probabilities of the plurality of candidate text segments;

processing the first text segment by using a constraint sub-model in the language model, so as to obtain extendibility relationships of the plurality of candidate text segments with respect to the first text segment;

adjusting the initial language probabilities of the candidate text segments according to the extendibility relationships, so as to obtain respective first language probabilities of the plurality of candidate text segments; and determining a target text segment from the plurality of candidate text segments according to the first language probabilities and the acoustic probabilities, so as to obtain a text sequence for the speech data to be recognized, wherein the constraint sub-model is trained based on a text in a predetermined text set, and wherein the processing the first text segment by using a first language sub-model in a language model so as to obtain respective initial language probabilities of the plurality of candidate text segments comprises:

performing an embedding on the first text segment to obtain a text embedding feature;

determining a first identification feature of a vertical category to which the first text segment belongs; and processing, by using the first language sub-model, a feature obtained by fusing the text embedding feature and the first identification feature, so as to obtain the respective initial language probabilities of the plurality of candidate text segments.

2. The method according to claim 1, wherein the language model further comprises a second language sub-model provided in parallel with the first language sub-model, and the method further comprises:

inputting the text embedding feature into the second language sub-model to obtain a first implicit representation of the first text segment;

wherein the first language sub-model comprises a first feature extraction network and a first prediction network, and the processing, by using the first language sub-model, a feature obtained by fusing the text embedding feature and the first identification feature so as to obtain the respective initial language probabilities of the plurality of candidate text segments comprises:

inputting the feature obtained by fusing the text embedding feature and the first identification feature into the first feature extraction network to obtain a second implicit representation; and inputting a feature obtained by fusing the first implicit representation and the second implicit representation into the first prediction network to obtain the respective initial language probabilities of the plurality of candidate text segments, wherein the second language sub-model is trained using sample texts of a plurality of predetermined vertical categories.

3. The method according to claim 2, wherein the second language sub-model comprises a second feature extraction network and a second prediction network;

wherein the inputting the text embedding feature into the second language sub-model to obtain a first implicit representation of the first text segment comprises:

inputting the text embedding feature into the second feature extraction network to obtain the second implicit representation;

the method further comprises:

inputting the second implicit representation into the second prediction network to obtain respective second language probabilities of the plurality of candidate text segments; and determining the target text segment according to the second language probabilities, the first language probabilities and the acoustic probabilities.

4. The method according to claim 2, wherein the language model further comprises a third language sub-model provided in parallel with the first language sub-model, and the method further comprises:

determining a second identification feature representing a source of the speech data to be recognized;

processing, by using the third language sub-model, a feature obtained by fusing the text embedding feature and the second identification feature, so as to obtain respective third language probabilities of the plurality of candidate text segments; and determining the target text segment according to the third language probabilities, the first language probabilities and the acoustic probabilities.

5. The method according to claim 4, wherein the third language sub-model comprises a third feature extraction network and a third prediction network, and the processing, by using the third language sub-model, a feature obtained by fusing the text embedding feature and the second identification feature so as to obtain respective third language probabilities of the plurality of candidate text segments comprises:

inputting the feature obtained by fusing the text embedding feature and the second identification feature into the third feature extraction network to obtain a third implicit representation; and inputting a feature obtained by fusing the first implicit representation and the third implicit representation into the third prediction network to obtain the respective third language probabilities of the plurality of candidate text segments.

6. The method according to claim 1, wherein the first text segment is a start-of-text identifier, and the vertical category to which the first text segment belongs comprises a plurality of predetermined vertical categories, and the processing, by using the first language sub-model, a feature obtained by fusing the text embedding feature and the first identification feature so as to obtain the respective initial language probabilities of the plurality of candidate text segments comprises:

fusing, for each of the plurality of predetermined vertical categories, the text embedding feature and an identification feature of each predetermined vertical category to obtain a first fusion feature; and processing the first fusion feature using the first language sub-model to obtain the respective initial language probabilities of the plurality of candidate text segments.

7. The method according to claim 1, wherein the plurality of candidate text segments comprise a plurality of first candidate segments indicating candidate words, and the determining a target text segment from the plurality of candidate text segments according to the first language probabilities and the acoustic probabilities so as to obtain a text sequence for the speech data to be recognized comprises:

querying a predetermined text list according to the first text segment to determine a first specified segment from the plurality of first candidate segments, wherein a text obtained by concatenating the first text segment and the first specified segment belongs to the predetermined text list; and determining the target text segment from the plurality of first candidate segments according to a first language probability of the first specified segment and an acoustic probability of the first specified segment.

8. The method according to claim 7, wherein the predetermined text list comprises a plurality of texts and a recognition weight of each of the plurality of texts, the recognition weight indicates a difficulty level of recognizing the text, and the determining the target text segment from the plurality of first candidate segments according to the first language probability of the first specified segment and the acoustic probability of the first specified segment comprises:

determining a first target text to which the text obtained by concatenating the first text segment and the first specified segment belongs in the predetermined text list; and determining the target text segment from the plurality of candidate text segments according to the recognition weight of the first target text, the first language probability of the first specified segment and the acoustic probability of the first specified segment.

9. The method according to claim 7, wherein the plurality of candidate text segments further comprise a plurality of second candidate segments indicating candidate slots, the candidate slots comprise entry slots, and wherein the determining a target text segment from the plurality of candidate text segments according to the first language probabilities and the acoustic probabilities so as to obtain a text sequence for the speech data to be recognized further comprises:

determining, from the entry slots, a target slot belonging to the predetermined text list;

processing, by using the language model, a feature obtained according to a third identification feature of the target slot and a start-of-text identifier, so as to obtain fourth language probabilities of the plurality of first candidate segments with respect to the target slot; and determining the target text segment from the plurality of first candidate segments according to the fourth language probabilities, the first language probabilities and the acoustic probabilities.

10. The method according to claim 9, wherein the candidate slots further comprise exit slots, and wherein the determining a target text segment from the plurality of candidate text segments according to the first language probabilities and the acoustic probabilities so as to obtain a text sequence for the speech data to be recognized further comprises:

fusing a first identification feature of a vertical category to which the first text segment belongs and a fourth identification feature of a slot corresponding to a text segment at a last position in the first text segment, so as to obtain a second fusion feature;

processing the second fusion feature using the language model to obtain respective fifth language probabilities of the plurality of first candidate segments with respect to the exit slots; and determining the target text segment from the plurality of first candidate segments according to the fifth language probabilities, the fourth language probabilities, the first language probabilities and the acoustic probabilities.

11. The method according to claim 9, wherein the determining, from the entry slots, a target slot belonging to the predetermined text list comprises:

determining, from the entry slots, slots belonging to the predetermined text list, so as to obtain initial slots; and determining the target slot from the initial slots according to a difference between a first language probability of a second candidate segment indicating the initial slot and the first language probabilities of the plurality of the first candidate segments, wherein the first language probability of the second candidate segment indicating the target slot is greater than the first language probability of the second candidate segment indicating another slot other than the target slot among the initial slots.

12. The method according to claim 9, wherein the determining the target text segment from the plurality of first candidate segments according to the fourth language probabilities, the first language probabilities and the acoustic probabilities comprises:

querying the predetermined text list according to the first text segment to obtain a second target text and a second specified segment among the plurality of first candidate segments, wherein a text obtained by concatenating the first text segment and a target candidate segment indicating the target slot corresponding to the second specified segment belongs to the second target text;

obtaining an initial probability of the target candidate segment according to a recognition weight of the second target text and a first language probability of the target candidate segment; and determining the target text segment from the second specified segment according to a fourth language probability of the second specified segment and the initial probability.

13. The method according to claim 9, further comprising:

querying, in response to the text sequence comprising a slot text segment belonging to the candidate slot, a text segment table for the candidate slot according to the slot text segment;

determining, in response to the slot text segment not belonging to the text segment table, a text segment having a greatest similarity to the slot text segment in the text segment table as a candidate segment; and replacing the slot text segment in the text sequence with the candidate segment, so as to obtain a recognition result for the speech data to be recognized.

14. The method according to claim 9, further comprising:

storing a language probability obtained by processing a first target feature using the language model in a cache, in response to a number of times of processing the first target feature using the language model reaching a predetermined value;

querying the cache according to a second target feature, in response to the second target feature to be processed using the language model; and reading a language probability of the second target feature from the cache to complete processing of the second target feature using the language model, in response to the language probability of the second target feature being stored in the cache, wherein the first target feature and the second target feature comprise any feature selected from: a text embedding feature of the first text segment, a feature obtained by fusing the text embedding feature and an identification feature of a vertical category, a feature obtained by fusing the text embedding feature and an identification feature indicating a data source; or a feature obtained by fusing the text embedding feature and an identification feature of a slot; or the determining a target text segment from the plurality of candidate text segments according to the first language probabilities and the acoustic probabilities is performed by a graphics processing unit provided on an electronic device.

15. The method according to claim 1, wherein samples for training the constraint sub-model comprise a positive sample and a negative sample, the positive sample comprises a text in the predetermined text set, and the negative sample is obtained by:

adjusting a predetermined text according to a second text segment among the plurality of candidate text segments that is inconsistent with a text segment at a target position in the predetermined text.

16. The method according to claim 15, wherein adjusting the predetermined text according to the text segment among the plurality of candidate text segments that is inconsistent with the text segment at the target position in the predetermined text so as to obtain the negative sample comprises:

determining a segment for replacement in the second text segment according to a confusion relationship between the second text segment and the text segment at the target position in the predetermined text; and replacing the text segment at the target position in the predetermined text by the segment for replacement, so as to obtain the negative sample.

17. The method according to claim 15, wherein adjusting the predetermined text according to the text segment among the plurality of candidate text segments that is inconsistent with the text segment at the target position in the predetermined text so as to obtain the negative sample comprises:

replacing the text segment at the target position in the predetermined text by the second text segment, so as to obtain candidate samples;

processing each of the candidate samples using the first language sub-model, so as to obtain a sixth language probability of each sample; and performing a selection on the candidate samples according to the sixth language probability, so as to obtain the negative sample; or adjusting the predetermined text according to the second text segment among the plurality of candidate text segments that is inconsistent with the text segment at the target position in the predetermined text so as to obtain the negative sample comprises:

replacing the text segment at the target position in the predetermined text by the second text segment, so as to obtain an initial text; and removing a text segment after the target position in the initial text, so as to obtain the negative sample.

18. An electronic device, comprising:

at least one processor; and a memory communicatively connected to the at least one processor, wherein the memory stores instructions executable by the at least one processor, and the instructions, when executed by the at least one processor, are configured to cause the at least one processor to:

process, by using an acoustic model, speech data to be recognized and a first text segment obtained by recognition, so as to obtain respective acoustic probabilities of a plurality of candidate text segments;

process the first text segment by using a first language sub-model in a language model, so as to obtain respective initial language probabilities of the plurality of candidate text segments;

process the first text segment by using a constraint sub-model in the language model, so as to obtain extendibility relationships of the plurality of candidate text segments with respect to the first text segment;

adjust the initial language probabilities of the candidate text segments according to the extendibility relationships, so as to obtain respective first language probabilities of the plurality of candidate text segments; and determine a target text segment from the plurality of candidate text segments according to the first language probabilities and the acoustic probabilities, so as to obtain a text sequence for the speech data to be recognized, wherein the constraint sub-model is trained based on a text in a predetermined text set, and wherein the instructions are further configured to cause the at least one processor to:

perform an embedding on the first text segment to obtain a text embedding feature;

determine a first identification feature of a vertical category to which the first text segment belongs; and process, by using the first language sub-model, a feature obtained by fusing the text embedding feature and the first identification feature, so as to obtain the respective initial language probabilities of the plurality of candidate text segments.

19. A non-transitory computer-readable storage medium having computer instructions therein, wherein the computer instructions are configured to cause a computer to:

process, by using an acoustic model, speech data to be recognized and a first text segment obtained by recognition, so as to obtain respective acoustic probabilities of a plurality of candidate text segments;

process the first text segment by using a first language sub-model in a language model, so as to obtain respective initial language probabilities of the plurality of candidate text segments;

process the first text segment by using a constraint sub-model in the language model, so as to obtain extendibility relationships of the plurality of candidate text segments with respect to the first text segment;

adjust the initial language probabilities of the candidate text segments according to the extendibility relationships, so as to obtain respective first language probabilities of the plurality of candidate text segments; and determine a target text segment from the plurality of candidate text segments according to the first language probabilities and the acoustic probabilities, so as to obtain a text sequence for the speech data to be recognized, wherein the constraint sub-model is trained based on a text in a predetermined text set, and wherein the computer instructions are further configured to cause the computer to:

perform an embedding on the first text segment to obtain a text embedding feature;

determine a first identification feature of a vertical category to which the first text segment belongs; and process, by using the first language sub-model, a feature obtained by fusing the text embedding feature and the first identification feature, so as to obtain the respective initial language probabilities of the plurality of the candidate text segments.

* * * * *